US009720554B2

(12) United States Patent
Frohwein

(10) Patent No.: US 9,720,554 B2
(45) Date of Patent: Aug. 1, 2017

(54) METHOD AND APPARATUS TO OPERATE DIFFERENT WIDGETS FROM A SINGLE WIDGET CONTROLLER

(76) Inventor: Robert J. Frohwein, Atlanta, GA (US)

( * ) Notice: Subject to any disclaimer, the term of this patent is extended or adjusted under 35 U.S.C. 154(b) by 360 days.

(21) Appl. No.: 12/507,507

(22) Filed: Jul. 22, 2009

(65) Prior Publication Data

US 2010/0023874 A1    Jan. 28, 2010

Related U.S. Application Data

(60) Provisional application No. 61/082,866, filed on Jul. 23, 2008.

(51) Int. Cl.
*G06F 3/048* (2013.01)
*G06F 3/0481* (2013.01)
*G06Q 10/10* (2012.01)
*G06Q 30/02* (2012.01)

(52) U.S. Cl.
CPC .......... *G06F 3/048* (2013.01); *G06F 3/04812* (2013.01); *G06Q 10/10* (2013.01); *G06Q 30/0255* (2013.01)

(58) Field of Classification Search
CPC ..... G06F 3/048; G06F 3/04812; G06Q 10/10; G06Q 30/0255
USPC .................................................. 715/747, 749
See application file for complete search history.

(56) References Cited

U.S. PATENT DOCUMENTS

| 7,216,300 | B2 * | 5/2007 | Dang | 715/783 |
|---|---|---|---|---|
| 7,269,792 | B2 * | 9/2007 | Consolatti et al. | 715/749 |
| 7,707,514 | B2 | 4/2010 | Forstall | |
| 7,954,064 | B2 * | 5/2011 | Forstall et al. | 715/779 |
| 8,056,092 | B2 * | 11/2011 | Allen et al. | 719/320 |
| 8,321,803 | B2 * | 11/2012 | Benedetti et al. | 715/769 |
| 8,595,186 | B1 * | 11/2013 | Mandyam et al. | 707/632 |
| 2002/0089536 | A1 * | 7/2002 | Dang | 345/749 |
| 2002/0091732 | A1 * | 7/2002 | Pedro | 707/505 |
| 2003/0067485 | A1 * | 4/2003 | Wong et al. | 345/747 |
| 2006/0080612 | A1 * | 4/2006 | Hayes et al. | 715/742 |
| 2006/0156250 | A1 * | 7/2006 | Chaudhri et al. | 715/802 |
| 2006/0277469 | A1 | 12/2006 | Chaudhri | |
| 2007/0101297 | A1 * | 5/2007 | Forstall et al. | 715/841 |
| 2007/0143264 | A1 | 6/2007 | Szeto | |
| 2007/0162850 | A1 | 7/2007 | Adler | |
| 2007/0276901 | A1 * | 11/2007 | Glinsky et al. | 709/203 |

(Continued)

OTHER PUBLICATIONS

Widget definition. IEEE Dictionary Standards and Terms, 7th Edition, Dec. 2000, p. 1279.*

(Continued)

*Primary Examiner* — Amy M Levy
(74) *Attorney, Agent, or Firm* — Muskin & Farmer LLC

(57) ABSTRACT

A method, apparatus, and computer readable storage to manage and display mini Graphical User Interface (GUI) applications, or widgets. A widget controller can be associated with a plurality of widgets, upon which a user of the widget controller can then cycle among the associated widgets to display a selected widget. This conserves space on an output device since space for only one widget is needed. Widgets controllers can be embedded on web pages which are part of social networking sites. Particular widgets associated with a widget controller can be automatically determined and associated based on content of a web page containing the widget controller.

8 Claims, 23 Drawing Sheets

(56) References Cited

U.S. PATENT DOCUMENTS

| | | |
|---|---|---|
| 2008/0028294 A1 | 1/2008 | Sell |
| 2008/0034040 A1 | 2/2008 | Wherry |
| 2008/0034314 A1* | 2/2008 | Louch et al. .............. 715/778 |
| 2008/0040681 A1* | 2/2008 | Synstelien et al. .......... 715/765 |
| 2008/0052348 A1* | 2/2008 | Adler et al. ................. 709/203 |
| 2008/0052637 A1 | 2/2008 | Ben-Yoseph |
| 2008/0074391 A1* | 3/2008 | Coe .............................. 345/163 |
| 2008/0082930 A1 | 4/2008 | Omernick |
| 2008/0097830 A1 | 4/2008 | Kim |
| 2008/0097871 A1 | 4/2008 | Williams |
| 2008/0148283 A1* | 6/2008 | Allen et al. .................. 719/316 |
| 2008/0168367 A1* | 7/2008 | Chaudhri et al. ............ 715/764 |
| 2008/0168368 A1 | 7/2008 | Louch |
| 2008/0195483 A1* | 8/2008 | Moore ........................... 705/14 |
| 2008/0222232 A1 | 9/2008 | Allen |
| 2008/0229211 A1* | 9/2008 | Herberger et al. ........... 715/744 |
| 2008/0235680 A1* | 9/2008 | Strauss et al. ............... 717/178 |
| 2008/0255962 A1* | 10/2008 | Chang et al. .................. 705/27 |
| 2008/0288582 A1* | 11/2008 | Pousti et al. ................. 709/203 |
| 2008/0313282 A1* | 12/2008 | Warila et al. ................. 709/206 |
| 2009/0119280 A1* | 5/2009 | Waters et al. ..................... 707/5 |
| 2009/0171754 A1* | 7/2009 | Kane et al. ..................... 705/10 |
| 2009/0172021 A1* | 7/2009 | Kane et al. .................. 707/104.1 |
| 2009/0249282 A1* | 10/2009 | Meijer et al. ................. 717/104 |
| 2009/0287559 A1* | 11/2009 | Chen et al. ................. 705/14.23 |

OTHER PUBLICATIONS

Widgetbox: widgetizing the web.2007. Retrieved from widgetbox.com via the Internet Archive Apr. 22, 2012.*

Anonymous. Java Tutorials: Layout published Spring 1999, retrieved from [http://vip.cs.utsa.edu/classes/java/tutorial/layouts.html] on [May 5, 2014].*

Office Actions in related U.S. Appl. No. 12/049,847.

International search report in PCT/US2009/037325.

Office Action in U.S. Appl. No. 12/049,847 dated Aug. 1, 2013.

\* cited by examiner

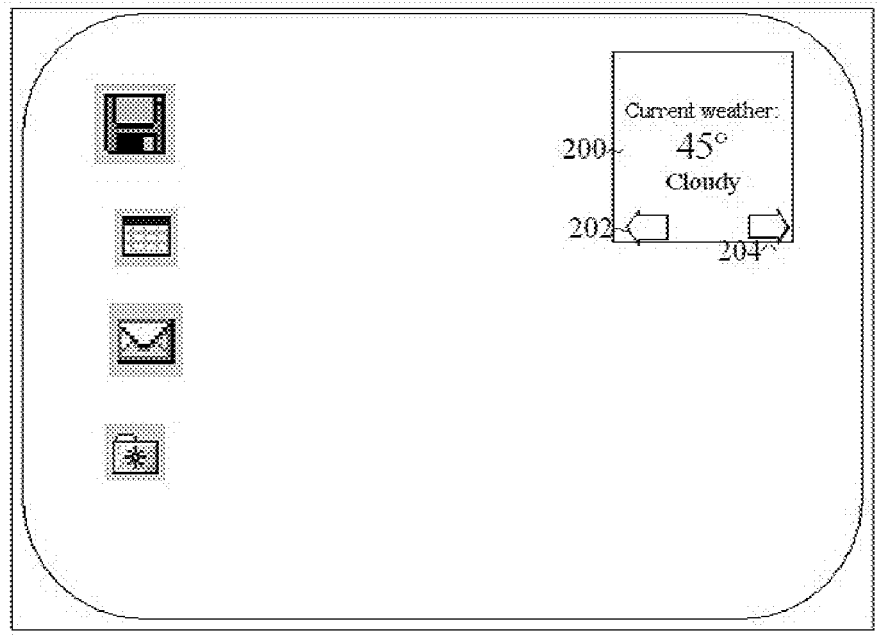
A
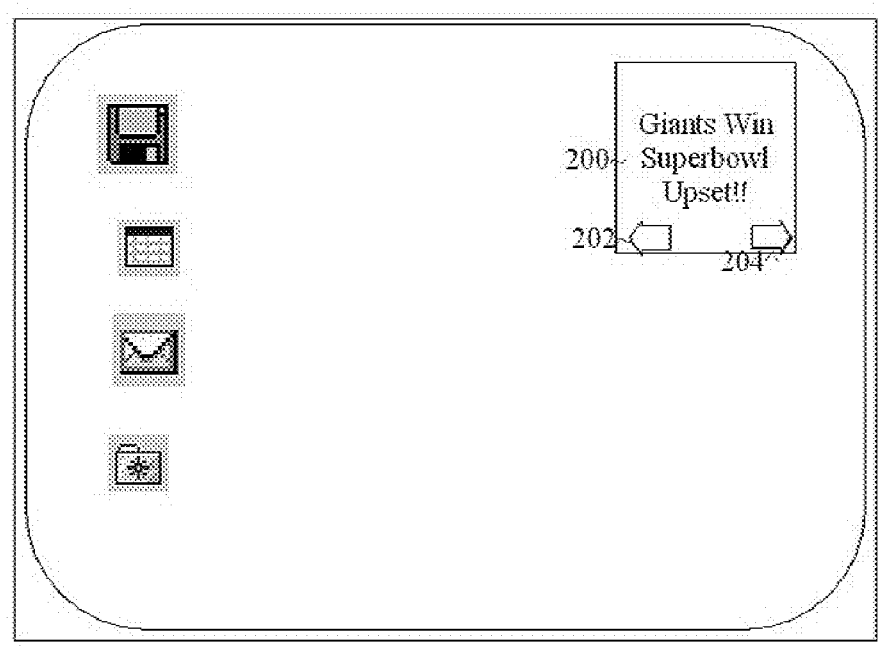
B
FIGURE 2

METHOD AND APPARATUS TO OPERATE DIFFERENT WIDGETS FROM A SINGLE WIDGET CONTROLLER

Priority is claimed to Patent Application No. 61/082,866, filed in the United States Patent and Trademark Office on Jul. 23, 2008, entitled, "Systems, Methods, and Computer Programs for Implementing a Widget Controller," which is incorporated by reference herein in its entirety. Priority is also claimed to patent application Ser. No. 12/049,847, filed in the United States Patent and Trademark office on Mar. 17, 2008, entitled "Method and Apparatus to Operate Different Widgets from a Single Widget Controller," which is incorporated by reference herein in its entirety.

The present inventive concept relates to a system, method, and computer readable storage, to combine operation of multiple widgets, videos and pictures into a single controller.

DESCRIPTION OF THE RELATED ART

Widgets are typically focused applications displayed on a relatively small area of a display which can perform a variety of pre-programmed functions, such as enabling the playing of games, providing video and/or audio content, or enabling other functions. For example, a weather widget may display the current weather for the user's location on an area of the user's desktop or on a page of the user's social networking profile. A stock ticker widget can display prices for preselected stocks in real time on the user's desktop. Typically, widgets take up a small area (e.g., one square inch) of display space as compared to the total display space visible.

FIG. 1 is a drawing illustrating a prior art desktop with three widgets. The desktop 100 is the part of the output device which is displayed in the background behind running programs. A game widget 101 allows the user to play a game inside the widget, a weather widget 102 displays the current weather conditions for the user's location, and the news ticker widget 103 displays current news. These are merely examples of prior art widgets. Icons 104 are icons the user may have on the user's desktop 100 which perform particular functions.

Users may have multiple widgets displayed simultaneously on their output device. Having multiple widgets displayed at once can take up a great deal of display space. Looking at FIG. 1, the three widgets clutter up the user's desktop space.

In addition to displaying widgets directly on the desktop, widgets can be embedded in (a) web pages, including personal web pages that are part of social, business or other type of networking sites such as Facebook, MySpace, Bebo and others, (b) internet start pages such as NetVibes or iGoogle, (c) devices such as a mobile device, television or computer desktop, and (c) and other locations that can display and enable the operation thereof.

Companies and individuals create widgets for a variety of reasons. For example, widgets represent another distribution channel for these content publishers. With tens and even hundreds of millions of individuals using social and business networking sites online, the presence of a content publisher's widget on these sites represents another opportunity to brand the publisher, distribute its content and place corresponding advertising. However, there are tens of thousands (if not more) of widgets that are currently vying for presence on users' pages on these types of sites (as well as on personal HTML pages such as iGoogle or on user's desktops such as an iMac). Therefore, it is difficult for these publishers to garner enough attention to broadly distribute their widgets or to assure themselves any type of permanency once placed in these locations (users can typically and easily replace out or eliminate undesired or underused widgets).

As stated and for example, widgets provide content publishers with a way to interact with users of the widgets while these widgets reside on the web page, mobile devices and desktops. For example, when a user downloads a particular widget from NBA.com, the website of the National Basketball Association, the user can "play" the widget and watch highlights from games played the night before, even if the user associated the widget weeks or months before.

What is needed is a more efficient and space conserving manner in which to allow users to select and display widgets on an output device. In addition, what is also needed is a way in which widget creators have the opportunity to be more easily seen by a broader audience of users of widgets and have more permanence once the widgets commence use in these situations.

SUMMARY OF THE INVENTION

It is an aspect of the present general inventive concept to provide a widget controller in order to control operation of widgets.

The above aspects can be obtained by a method of (a) associating to a widget controller associated widgets comprising at least a first widget and a second widget; (b) retrieving the associated widgets on a computer and displaying the widget controller on an output device associated with the computer; (c) displaying the first widget inside the widget controller; and (d) cycling, by the user, among the associated widgets to select a current widget which is displayed inside the widget controller which replaces the first widget.

The above aspects can also be obtained by a method of (a) receiving a category selection from an owner of a widget controller embedded on a host page, the widget controller allowing a visitor to the host page to select a particular widget out of a set of widgets on the widget controller and displaying the particular widget in the widget controller; (b) periodically adding, to the widget set, new widgets associated with the category; (c) displaying the widget controller on the web page; and (d) selecting, by the visitor, any one out of the set of widgets to display in the widget controller.

The above aspects can also be obtained by a method of (a) displaying a widget controller embedded on a host page, the widget controller allowing a visitor to the host page to select a particular widget out of a set of widgets on the widget controller and displaying the particular widget in the widget controller; (b) determining a targeted advertisement; (c) displaying the targeted advertisement on the widget controller, (d) wherein the targeted advertisement is determined based on content on the host page.

The above aspects can also be obtained by a method of (a) displaying a widget controller embedded on a host page, the widget controller allowing a visitor to the host page to select a particular widget out of a set of widgets on the widget controller and displaying the particular widget in the widget controller; (b) determining a targeted advertisement; (c) displaying the targeted advertisement on the widget controller, (d) wherein the targeted advertisement is determined based on widget usage data from the widget controller.

The above aspects can also be obtained by a method of (a) displaying a widget controller embedded on a host page, the widget controller allowing a visitor to the host page to select a particular widget out of a set of widgets on the widget controller and displaying the particular widget in the widget controller; (b) determining a targeted widget; (c) adding the targeted widget to the widget set, (c) wherein the targeted widget is determined based on content on the host page.

The above aspects can also be obtained by a method of (a) displaying a widget controller embedded on a host page, the widget controller allowing a visitor to the host page to select a particular widget out of a set of widgets on the widget controller and displaying the particular widget in the widget controller; (b) determining a targeted widget; (c) adding the targeted widget to the widget set, (d) wherein the targeted widget is determined based on widget usage data from the widget controller.

The above aspects can also be obtained by a method of (a) displaying a widget controller embedded on a host page, the widget controller allowing a visitor to the host page to select a particular widget out of a set of widgets on the widget controller and displaying the particular widget in the widget controller; (b) determining a targeted advertisement; (c) displaying the targeted advertisement on the widget controller, (d) wherein the targeted advertisement is determined based on content on at least one associated web page associated with the host page.

The above aspects can also be obtained by a method of (a) displaying a widget controller embedded on a host page, the widget controller allowing a visitor to the host page to select a particular widget out of a set of widgets on the widget controller and displaying the particular widget in the widget controller; (b) determining a targeted widget; (c) adding the targeted widget to the widget set, (d) wherein the targeted widget is determined based on content on at least one associated web page associated with the host page.

The above aspects can also be obtained by a method of (a) displaying a widget controller embedded on a host page, the widget controller allowing a visitor to the host page to select a particular widget out of a set of widgets on the widget controller and displaying the particular widget in the widget controller; (b) tracking usage of each widget in the set of widgets; (c) determining a new widget to add to the widget controller based on the usage; and (d) automatically adding the new widget to the widget controller.

The above aspects can also be obtained by a method of (a) displaying a widget controller embedded on a host page, the widget controller allowing a visitor to the host page to select a particular widget out of a set of widgets on the widget controller and displaying the particular widget in the widget controller; (b) tracking user ratings of each widget in the set of widgets; (c) determining a new widget to add to the widget controller based on the ratings; and (d) automatically adding the new widget to the widget controller, (e) wherein the determining comprises identifying a popular widget out of the set of widgets that has relatively high ratings, and selecting the new widget using relationship data and the popular widget.

The above aspects can also be obtained by a method of (a) displaying a widget controller, the widget controller allowing a user to select a particular widget out of a set of widgets on the widget controller and displaying the particular widget in the widget controller; (b) associating a shape with each of the widgets in the set of widgets, wherein shapes of at least two widgets in the set of widgets being different; (c) selecting a particular widget to display by the user; and (d) displaying the particular widget inside the widget controller, the widget controller being displayed to reflect the particular widget's respective shape, (e) wherein the widget controller is displayed embedded on a host page or on the user's desktop.

The above aspects can also be obtained by a method of (a) providing at least two suggested advertisements and preferred demographic data for each respective suggested advertisement; (b) tracking widget demographic data of users of a particular widget, the particular widget being located on at least two different web pages; (c) determining a particular advertisement, the particular advertisement being one out of the at least two suggested advertisements that has respective preferred demographic data which better matches the widget demographic data; and (d) serving the particular advertisement to a user, (e) wherein the tracked demographic data comprises age data or location data of users of the particular widget.

The above aspects can also be obtained by a method of (a) associating a plurality of widget controllers with a particular widget, thereby allowing display of the particular widget inside the respective widget controllers, wherein other widget controllers exist which are not associated with the particular widget; (b) providing an updated widget code for the particular widget which is an updated version of an earlier version of the widget; (c) identifying identified widget controllers which are associated with the particular widget; and (d) automatically transmitting the updated widget code to identified widget controllers, thereby automatically updating the particular widget to the updated version.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 2A is a drawing illustrating a desktop with a widget controller displaying a first widget, according to an embodiment;

FIG. 2B is a drawing illustrating a desktop with a widget controller displaying a second widget, according to an embodiment;

DESCRIPTION OF THE PREFERRED EMBODIMENTS

Figure 1:
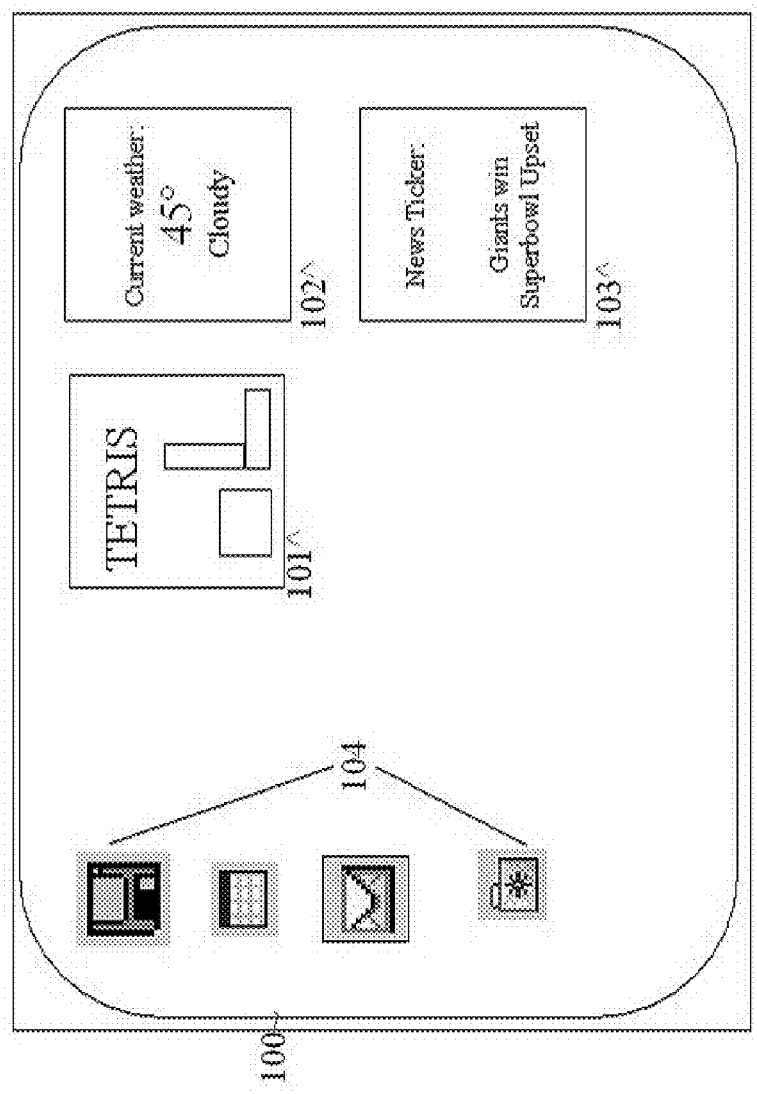
FIG. 1 is a drawing illustrating a prior art desktop with three widgets.

Reference will now be made in detail to the presently preferred embodiments of the invention, examples of which are illustrated in the accompanying drawings, wherein like reference numerals refer to like elements throughout.

Embodiments of the invention relate to "Widgets," also known as plug-ins, mini-applications, widget applications, gadgets, or mini-applets. Widgets can be further categorized as desktop widgets, web widgets, and mobile widgets. A desktop widget may be a downloadable mini application that can provide services to a user such as games, weather, stock quotes, etc., that is viewable on a user's desktop GUI of their display of a computer. A desktop widget may require a widget engine running on the desktop to allow operation of desktop widgets. A web widget may be a portable block of code that can be installed and executed within any separate HTML based (or other protocol) web page. Typically, such an application would not require any further code compilation, although in some variations further code compilation can still be performed before execution. Typically widgets run in a particular area on the user's desktop or on a web page. The particular area can be an area on a desktop or on a web page, although the particular area may still be movable (depending upon the requirements set forth by the desktop software or provider of the web page) to different locations on the desktop and/or web page. However, often times many different widgets will typically be displayed within this particular area. Mobile widgets are widgets designed to run on cellular telephones and Personal Digital Assistants (PDAs). Although for many widgets, some widget code can be downloaded to a computer or mobile device or embedded in a web page, it should also be understood that the widget itself may mostly (or even entirely reside) on a separate server and the GUI application presented is simply generated either mostly or entirely at the time of the interaction with the desktop, mobile device or web page, as the case may be. Although the foregoing descriptions speak to typical types of locations to find widgets today (desktops, mobile devices and web pages), it should be understood that widgets may soon be found on variety of other devices that provide a display including televisions, other mobile devices, and any type of display appropriate for the display and use of a widget in the future.

Widgets can typically be found on the web (either for free or for purchase) where they can be downloaded and used by an end user (either on the end user's desktop or the end user's web page of a social networking site, for example). Many web sites exist which showcase widgets and allow users to choose which widgets they want to download. In one embodiment, the entire widget application code may need to be downloaded to the end user's computer and/or the web site containing the controller. Alternatively, in other embodiments, only a portion of the widget application may need to be downloaded to the end user/s computer and/or the web site containing the controller. Further, it can also be implemented wherein no code at all is downloaded and the entire widget can be operated with code executing on the server side.

Note that widgets can have dynamic content. For example, a particular widget can display current audio and/or video clips which can be downloaded and/or streamed from a central server. Other dynamic content can be news, weather, stock price updates, etc. A widget controller can have an audio player associated with it which can play audio from a particular widget being displayed/activated.

In order to reduce the space that multiple widgets take up (either on the desktop, a web page, or in any context), a widget controller (or "widget wheel") can be implemented. The widget controller allows a user (not necessarily just the owner of a web page it appears on but also any authorized visitor) to cycle through different widgets which, in one embodiment of the present invention, would appear in the same area of the desktop or web page. In either of the foregoing manners, a user can explore multiple widgets without a lot of physical display space being taken up. In other words, different widgets are embedded (either virtually or actually) within the widget controller. The widget controller can be a widget itself.

FIG. 2A is a drawing illustrating a desktop with a widget controller displaying a first widget, according to an embodiment.

A widget controller 200 is displayed displaying a weather widget. The widget controller 200 has a left arrow 202 and a right 204 which provides one method of switching between different widgets. For example, the user can press right arrow 204 which will then change the widget and bring up FIG. 2B.

FIG. 2B is a drawing illustrating a desktop with a widget controller displaying a second widget, according to an embodiment. In this drawing, note that a different widget (a news ticker) is now displayed inside the widget controller 200. The news ticker has replaced the weather widget which was previously displayed. Note that the news ticker is displayed in the same area of the desktop as the weather widget. The user may also be able to interact with the area inside a widget, depending upon the functionality provided by widget publisher and the functionality requirements permitted by widget controller (including the base functionality enabled by the widget controller that may be duplicative to the functionality provided by the embedded widget). For example, a game widget may implement controls in which the user will click areas inside the widget in order to play the game.

Note that the different widgets are all displayed inside the same widget controller 200. The widget controller 200 can typically be moved by a user to a location on the display of the user's choosing, if allowed by the display provider. The individual widgets will be displayed inside the widget controller where the widget controller is located.

Widgets are also commonly embedded into web pages. This can be done by pasting an html (or other protocol) snippet of code that links to the widget on a server. The code can be pasted manually or through a utility function provided by the server provider to enable display on a particular location of the web page where the owner wants the widget to appear. It is not uncommon that web page owners have more than one widget on their page at any one time, thereby taking up a great deal of display space on their web page, for example their profile page of their social networking site.

In an embodiment, one way a widget controller can operate is by storing widgets in a widget set associated by the widget controller. Either code for the widgets themselves can be stored, or pointers to the code can be stored (either pointing to a web address where the widget can be found and/or a local address on the user's computer where the widget can be found). The widget controller can display the widgets in the widget set to the user and when the user selects a particular widget, the widget controller can execute respective code for that particular widget and thereby display the particular widget's operations inside the widget controller.

Figure 3:
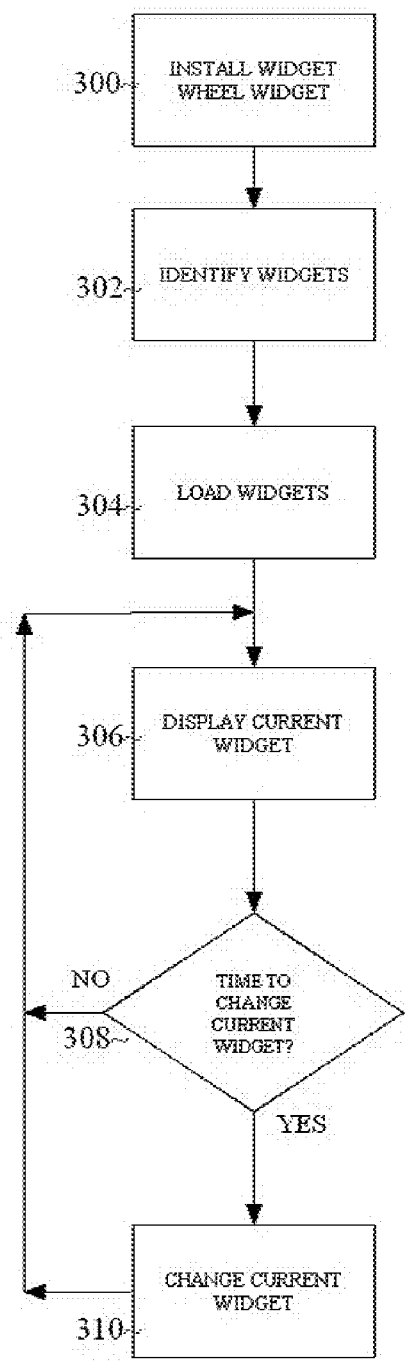
FIG. 3 is a flowchart illustrating an exemplary method of implementing a widget controller, according to an embodiment.

FIG. 3 is a flowchart illustrating an exemplary method of implementing a widget controller, according to an embodiment.

The method can start with operation 300, which installs the widget controller, either on a desktop, a web page, a mobile device, or a dedicated web application such as WEBTV. The widget controller itself can be a widget (although it is not required to be one). In an embodiment, installation of the widget controller will also prompt the user to input characteristics and preferences related to the user, for example the user's interests, etc. The characteristics can then be used later on in order to automatically select and download widgets to deliver to the widget controller. The user can later update preferences that may impact which widgets are provided for preview, a feature that is described in greater detail below. Other methods of associating widgets are detailed below.

From operation 300, the method proceeds to operation 302, which identifies a set of widgets to use for the widget controller. This can be done using a number of methods. The user can select the widgets the user wishes to use from a web site or other library of widgets. The widgets the user selects can then be, for example, downloaded to the user's computer or incorporated into their widget controller on his or her social networking page. The set of widgets can have associated with them a sequential order (which is used to determine the order the individual widgets in the set are displayed). See FIG. 5 and the accompanying description for more details on how this can be done.

In additional to listing the different widgets numerically, they can also be listed alphabetically, by category (e.g., games, sports, news, etc.), by popularity (e.g., rating, usage), by date installed, or by any parameter that the system may store about each widget.

From operation 302, the method can proceed to operation 304 which loads the identified widgets from operation 302 in memory. This operation may be optional, depending on the configuration. For example, the user's computer may already pre-store the identified widgets on the user's storage device (e.g., hard drive, flash memory, etc.) and there may be no need to reload them.

If the widget is being displayed embedded inside a web page, then this operation may not be necessary, as each time a new widget is displayed the code for that widget can be invoked thereby loading that respective widget from a server online. Alternatively, all the widgets identified by the widget controller can be preloaded ahead of time and cached on the user's computer. In this manner, an internet connection would not be required to run each widget (unless a particular widget requires one). This latter embodiment may be helpful when implementing a widget controller on a cell phone or other mobile device wherein internet service may be interrupted.

From operation 304, the method can proceed to operation 306, which displays a current widget.

From operation 306, the method can proceed to operation 308 which determines whether it is time to change the current widget. This can be done in a number of ways. In one embodiment, the current widget stays static until the user indicates his or her desire to change the current widget using a number of different GUI techniques, such as pressing a button (e.g., an arrow) on the widget controller itself. In another embodiment, the current widget can cycle to a next widget after a predetermined time elapses. In either embodiment, after the last widget in the set of widgets is displayed, when the widget is changed again the current widget can then become the first widget.

If in operation 308, the user wishes to change the current widget, then the method can proceed to operation 310, which changes the current widget to a new widget. Arrow buttons on the widget controller can cycle through the identified widget in sequential order (one arrow can cycle forward while another arrow can cycle in reverse). The method then returns to operation 306 which displays the current widget. Still another method to change widgets is a simple drag down method that enables a user to scroll through available widgets associated with the controller and select the desired current widget.

The method described above with relation to FIG. 3 illustrates an embodiment where the widgets to be chosen are preselected by the user. However, in a further embodiment, new widgets can automatically be downloaded to the widget controller without the user (owner of the computer running the widget controller or owner of the web page embedding the widget controller) instructing the widget controller to do this.

For example, after a predetermined amount of time, a new widget can be downloaded to a user's widget controller and made available as one of the multiple widgets in the user's widget controller. The new widget can be added to the user's previous widgets in the user's widget wheel, or the new widget can replace a widget in the user's widget wheel. The widget that is to be automatically downloaded can be determined using a number of different methods.

For example, a web site associated with the widget controller can automatically send a new widget to each user that has the widget controller widget on their computer. The web site itself can choose the new widget in a number of ways. For example, an administrator of the web site can simply manually choose the new widget to be downloaded to user's widget controllers. Alternatively, the widget that is downloaded to the user's widget controller can be chosen randomly out of a library of available widgets.

A new widget that is automatically downloaded to the user's widget controller can also be chosen based on the user's preferences. For example, when the user installs the widget controller, the user can be prompted to enter his preferences/characteristics (as discussed in operation 300) or these preferences may be updated from time to time after initial installation. These characteristics can then be used to determine targeted widgets to serve to respective users.

These widgets that are automatically downloaded to a user's widget controller may be done so the user may preview the widget for further use. These widgets may become a more permanent part of the widget controller. A widget controller may even come "preloaded" with certain widgets from certain widget publishers. This may be done to help the user enjoy the widget from the initial installation, but this may also be done because a widget publisher has paid for the privilege of being part of the preloaded package of content.

Figure 4:
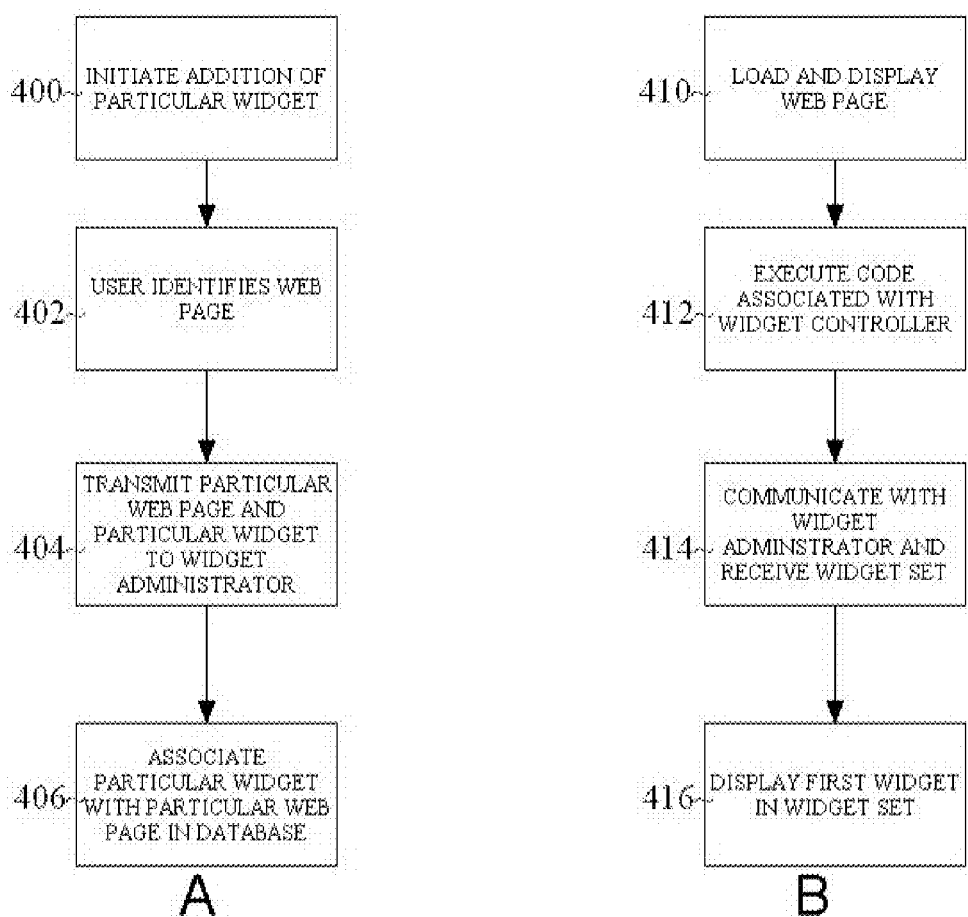
FIG. 4A is a flowchart illustrating an exemplary method of maintaining a widget administrator database, according to an embodiment.
FIG. 4B is a flowchart illustrating an exemplary method of retrieving a widget controller's respective widget set, according to an embodiment.

FIG. 4A is a flowchart illustrating an exemplary method of maintaining a widget administrator database, according to an embodiment.

A user can add a particular widget to the user's widget controller in a number of ways. One method lets the user "grab" another widget on the web and seamlessly add it into the user's widget controller. This can be done when the user sees a particular widget on the web that the user wants (and assuming the widget has the transfer functionality). The user can press a button on the desired widget to add that widget to the widget controller associated with the user's web page(s). There are other methods of associating widgets with the widget controller including identifying and associating desired widgets through a search function on the widget controller, as will be described in more detail later. Another method can be the ability of the widget controller to scan widgets currently displayed on a desktop or on a user's web page (e.g. social networking page) and automatically associate some or all of these widgets with the widget controller. Thereafter, it may be possible to delete all widgets that have been associated with the widget controller from duplicative placement on the desktop or social networking page. This operation serves to "clean up" these areas and organize them.

Once the user presses a button on a desired widget to initiate a transfer, the method can proceed to operation 402, wherein the user will then be presented with the opportunity to fill in information in order to complete the transfer. The user can specify the user's URL of the user's web page he wants to add the widget onto or other identifying information so that the particular widget controller associated with that URL will be updated. Alternatively, each widget controller can have an ID number or account name in which the user can identify. The user may or may not be required to provide the user's identification information, depending on the embodiment.

From operation 402, the method can proceed to operation 404, which transmits the particular web page (and/or other information entered by the user in operation 402) to a widget administrator. The widget administrator is a server accessible via the Internet (or other computer communications network) which maintains associations between individual widget controllers and their respective widget sets. Widget controllers can be identified by their associated web page where they reside (assuming there is only one widget controller allowed per web page). If there is more than one widget controller associated with a particular web page, social networking profile, user desktop, etc., then further identifying information may be required (e.g., a widget number for the particular host). It is contemplated that some individuals may want to associate multiple widget controllers with their desktops or web pages.

The widget administrator receives the information relating to the user and the particular widget and stores/updates such information in a database. This database would store every widget controller operated by the entity owning the widget administrator and their particular widget sets. Table I below is an exemplary table illustrating how the widget administrator database can store associations between web pages, widget controller ID numbers (optional numbers which identify each individual widget controller), and their widget set. Of course, such data can be updated or modified at any time. Users are free to remove widgets from their widget sets that they no longer desire. Further, additions or removals of widgets may happen automatically.

TABLE I

| URL | widget controller # | Widget set |
|---|---|---|
| www.lavagroup.net/about | 104 | #21, #99, #48 |
| http://profile.myspace.com/index.cfm? | 108 | #43, #54, |

TABLE I-continued

| URL | widget controller # | Widget set |
|---|---|---|
| fuseaction=user.viewprofile&friendid=103821796 | | #99 |
| www.patentstrademarks.com/about | 143 | #101 |

Further note in Table I that the widget set column stores a number identifying a particular widget. For example, widget number 21 can be a particular weather widget. A further database of associations between widget numbers and information required to install each respective widget can be maintained. For example, Table II stores associations between widget numbers and where such widgets can be downloaded.

TABLE II

| Widget # | address to download widget |
|---|---|
| #20 | www.weatherwidget.com |
| #21 | ftp.widgetworld233.com/widget21 |
| #43 | www.abcxyx.com/widget1 |
| #48 | www.samplelink.com |
| #54 | www.widget54.com/widget99 |
| #98 | www.joespage.com |
| #101 | c:\widget101.widget |

It is noted that in Tables I and II, any additional information needed to maintain such entries in the database can be included as well. These tables merely represent a simple example of how the widget administrator can store respective widget sets for each widget controller, and identify the individual widgets in each widget set. For example, table I can also store user's identities, preferences, email addresses, references to deleted widgets, previewed widgets, friend's information, other widget controllers utilized by the person, preferences generated from information found on such user's social networking pages, passwords, etc. Table II can also point to local areas of storage where the particular widgets can be found (instead of having to download them from the Internet each time they are needed), the name of the publisher of the widget, other widgets owned/created by such publisher, etc.

From operation 404, the method can proceed to operation 406, which associated the particular widget that is being added with the particular web page for the user (entered in operation 402) in the database. For example, in table I, if the owner of lavagroup.net/about page wants to add widget #200 to his or her page, then #200 will be added to that pages widget set in the database.

When a web page containing a widget controller is first displayed, the embedded widget controller needs to know which widgets are in the widget set for the widget controller (e.g., are to be made available in the widget controller).

FIG. 4B is a flowchart illustrating an exemplary method of retrieving a widget controller's respective widget set, according to an embodiment.

The method can begin with operation 410, which loads and displays a web page that contains a widget controller.

From operation 410, the method can proceed to operation 412, which executes code associated with the widget controller. The code performs any initialization of the widget controller needed. It is also noted that not all the code need exist on the client side, some code may exist on the server side (e.g., from the widget administrator) which can execute on the widget administrator and communicate with the widget controller.

Further, a widget controller may include a widget which contains a mini-web browser which functions as a web browser. Thus, a user of this widget can operate the mini-web browser and identify a location on the web, wherein the mini-web browser grabs a widget from the location on the web and displays it in the mini-web browser on the widget. This, this widget is actually emulating other widgets that may appear on other web pages.

From operation 412, the method can proceed to operation 414, which communicates with the widget administrator to determine the widget set associated with the widget controller. The web page being displayed and/or an identification number of the widget controller can be transmitted to the widget administrator, upon which the widget administrator would respond with identifiers of widgets in the widget set associated with the widget controller. The widget administrator may also transfer to the user any code for widgets in the widget set that the user does not already have on the user's machine.

From operation 414, the method can proceed to operation 416, which displays the first widget in the widget set and makes all of the remaining widgets in the widget set available to the user in the widget controller (as described herein).

Figure 5:
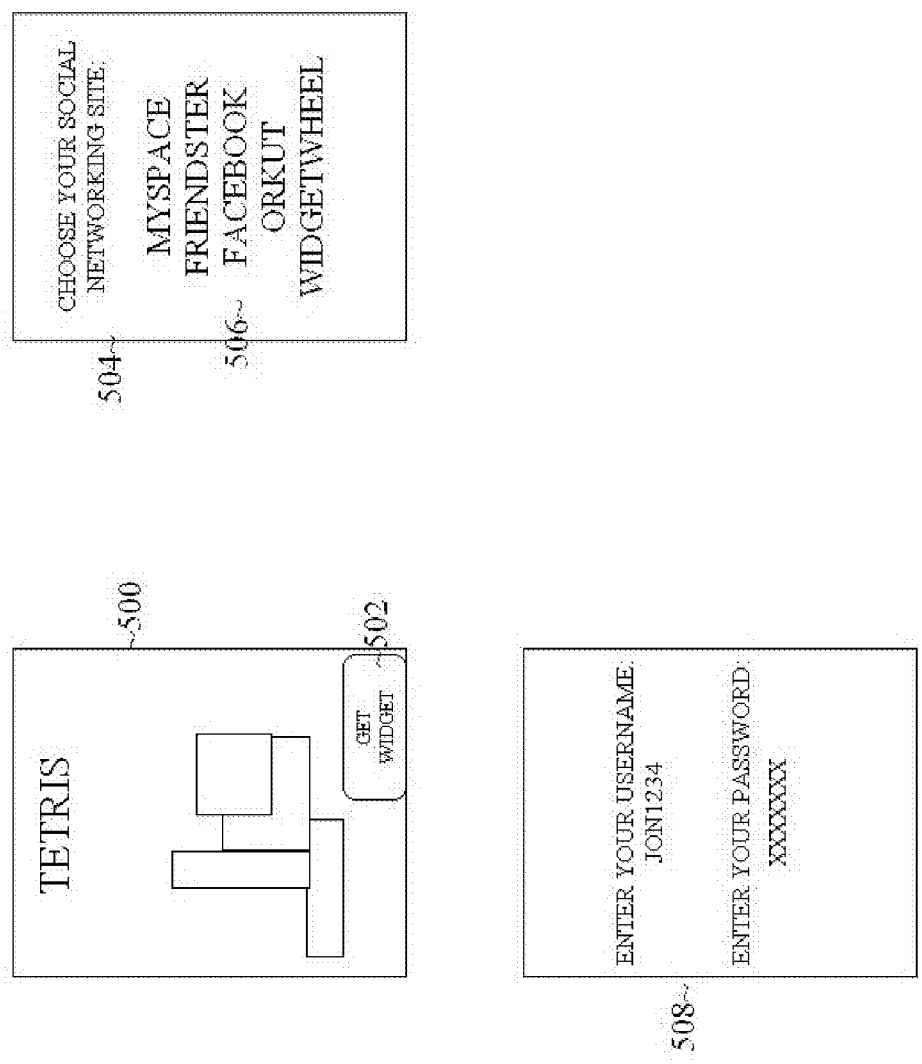
FIG. 5 is a drawing illustrating the addition of a widget to a particular user's web page, according to an embodiment.

FIG. 5 is a drawing illustrating the addition of a widget to a particular user's web page, according to an embodiment.

A user can view a widget 500 on a web page. The widget 500 can contain a get widget button 502, which when pressed, brings up a first prompt 504. The first prompt asks the user which networking site the user wants to install the widget to. A particular company, for example "Widget-Wheel," can administer the widget administrator as described herein. Thus, if the user wants to add this particular (Tetris) widget to the user's widget controller, the user can select "widgetwheel" upon which the second prompt 508 appears asking for the user's username and password.

Once the username and password are received, this information can then be transmitted to the widget administrator, which then associates this particular widget with the user's widget controller (and/or the user's web page). Thus, when that widget controller is then displayed, this widget will be included in the controllers widget set (since the widget administrator will be queried each time the widget controller is executed) and will then be available to all visitors of the web page embedding the widget controller as one of the widgets in the widget set on the widget controller.

Another method that widgets can be added to widget controllers is by manually programming HTML (or any other markup language such as XML) to identify each widget that is to be associated with the widget controller. Each time the widget controller is then activated, those widgets identified in the code can be retrieved (if not already located on the user's computer) and available on the widget controller.

Figure 6:
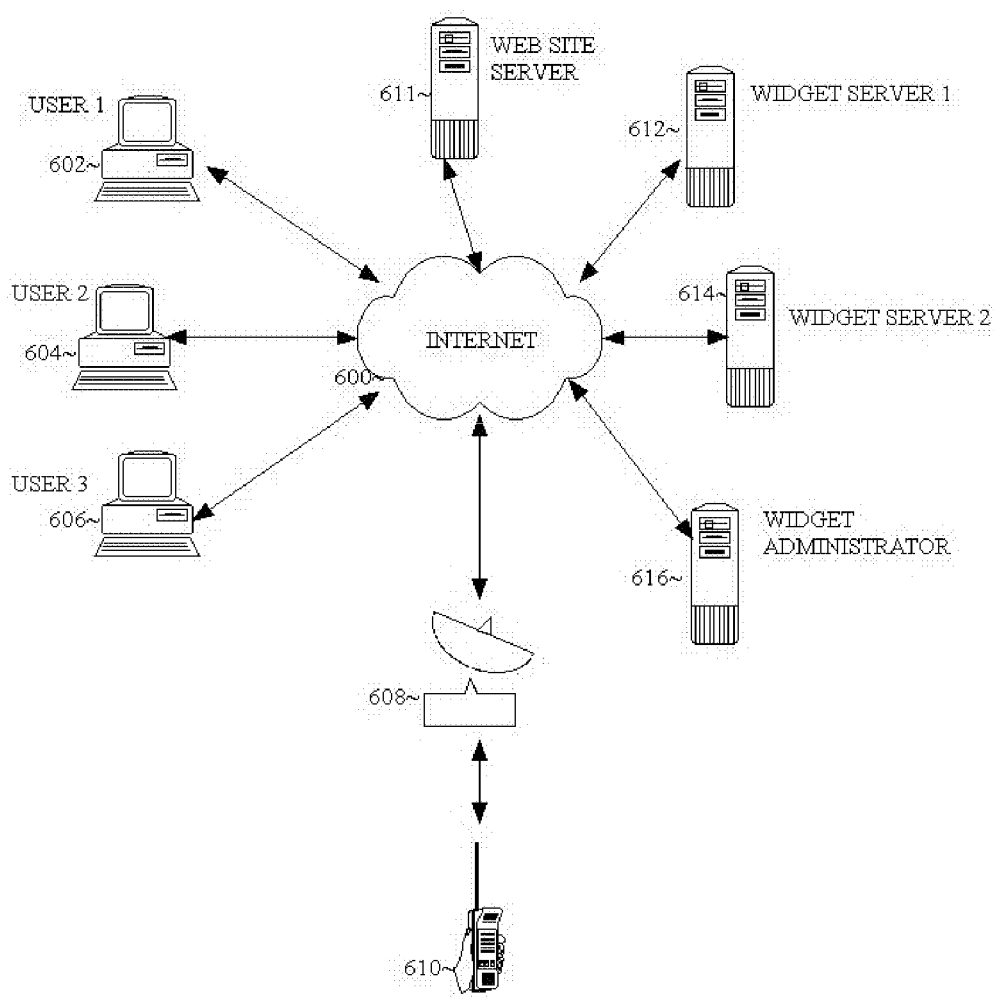
FIG. 6 is a network diagram illustrating components of a widget delivery system, according to an embodiment.

FIG. 6 is a network diagram illustrating components of a widget delivery system, according to an embodiment.

A computer communications network such as the Internet 600 can be used to coordinate communication between the different participants of the system. User 1 602, user 2 603, and user 3 606 are all different internet users which use different computers. Each of their respective output displays can display one or more widget controller(s). A mobile user 610 connects to the Internet 600 through a wireless communication point 608. The mobile user 610 can be using a cell phone, wireless PDA, etc., which can display a widget controller in a fashion as described herein.

A web site server 611 is used to serve web sites to users (e.g., user 1 602, user 2 604, user 3 606). Of course, many such web site servers exist throughout the Internet. Widget sever 1 612 and widget server 2 614 are servers which store widget files and transmit these files to requesting participants (e.g., any of the users, web sites, or widget administrator). Of course, many more widget servers can exist on the Internet.

Widget administrator 616 is an important component to the system. The widget administration can be a server/database system used to administer widget controllers. The widget administrator 616 maintains the associations between web pages and their respective widget sets. The widget administrator 616 also handles all other administrative tasks needed so that any of the operations described herein can be implemented.

The widget administrator 616 also maintains a list of subscribers, people who control web pages which host a widget controller. Each subscriber can have a username and password so that each subscriber can identify themselves to the widget administrator. The widget administrator can also operate a web site located on a URL, e.g., www.widget-wheel.com, which allows subscribers to administer their accounts. From this web sites, subscribers can log on, select widgets for their widget controller(s), review usage data for their widgets, or any other administrative tasks.

The actual appearance of a widget controller can vary based on design considerations. A widget controller can also be provided with different "skins" wherein the user can select a look based on the user's own preferences. Further, depending upon the widget that is selected to be displayed and/or used, the widget controller may automatically shift in size to appropriate accommodate the widget selected.

Thus, one example of how the entire system can operate is as follows. User 1 602 is a subscriber to the widget administrator 616. This means that user 1 602 has an account with the widget administrator 616 which has allocated a particular widget controller for a particular web page owned (or controlled) by user 1 602. The particular web page can be, for example, user 1's MySpace page (or any other page wherein user 1 602 can control at least a portion of the content). The particular web page can be served by web site server 611. When user 2 604 (who is not a subscriber to the widget administrator 616) visits the particular web page controlled by user 1 601, the web site server 611 will serve the particular web page to user 2 604 so that the particular web page will be displayed on user 2's 604 computer. The widget controller hosted (or embedded) on the particular web page will also be served to user 2's 604 (either from the widget administrator 616 or the web site server 611). The widget administrator 616 will transmit a current widget set to the widget controller being displayed on user 2's 604 computer, so that a user can determine the current set of widgets available through that widget controller for the particular web page. Widget server 1 612 can be a developer of widgets who serves their widgets to the widget administrator 616 so that the widget administrator 616 can then serve those widgets to widget controllers which are subscribers to the widget administrator 616. User 2's 604 interaction with the widget controller on the particular web page controlled by user 1 601 can then automatically cause the widget set of the widget controller to change (as described herein. This can happen, for example, if user 2 604 uses a particular widget on the widget controller a lot (gives the particular widget a high rating), which in turn can cause the widget administrator 616 to automatically serve a similar widget to the widget controller (which can then be added or replace an older widget on the widget controller). So when user 3 606 (who is also not a subscriber to the widget administrator) visits the particular web page, the widget set can be different from the set that user 2 604 was first presented with.

Figure 7:
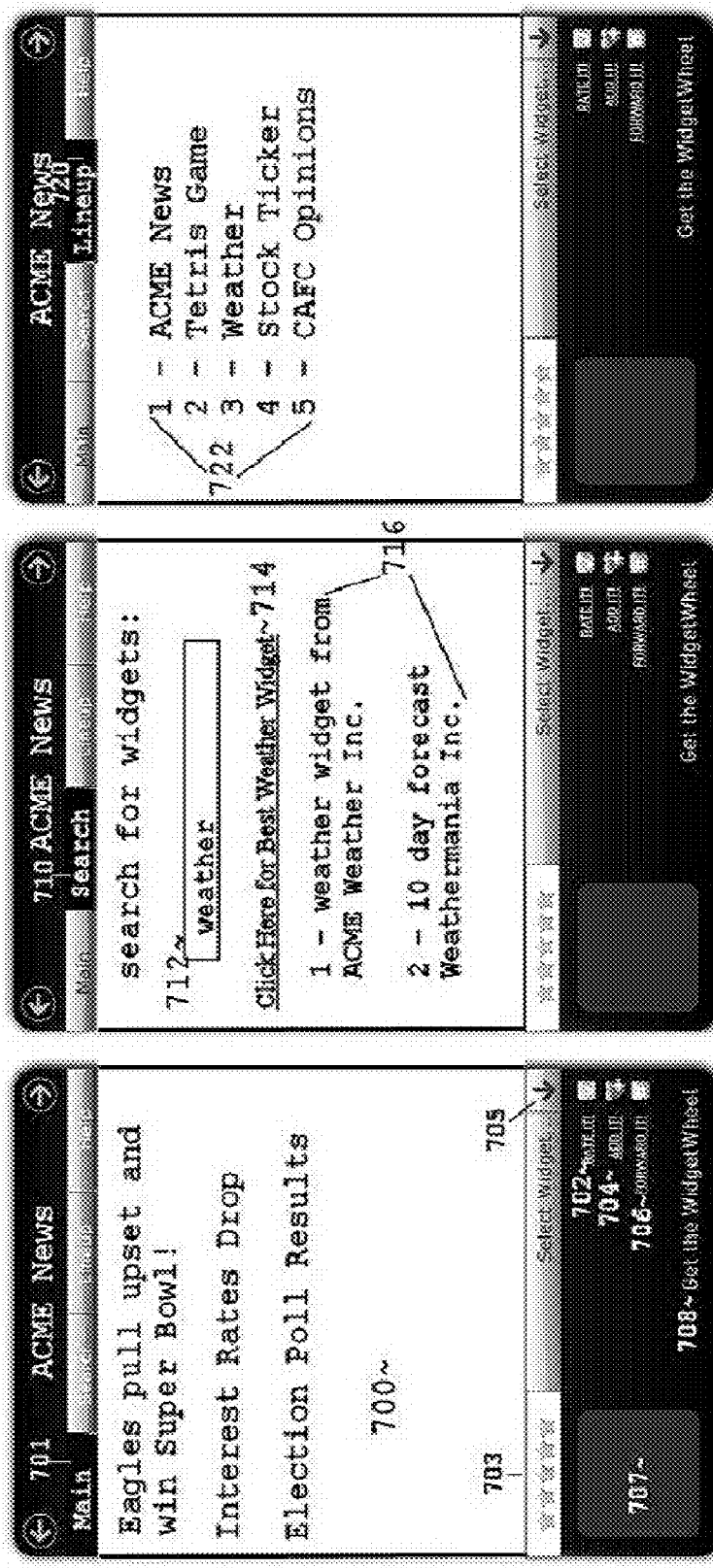
FIG. 7A is an example of a widget controller displaying a particular widget, according to an embodiment.
FIG. 7B is an example of a widget controller displaying a search operation, according to an embodiment.
FIG. 7C is an example of a widget controller displaying a lineup operation, according to an embodiment.

FIG. 7A is an example of a widget controller displaying a particular widget, according to an embodiment.

A main window 700 shows a current widget. The widget controller may have many different widgets available, but only displays one widget (a current widget) at a time. In this example, a news widget ("ACME News") is being displayed. This example widget pulls news headlines off of a news server, displays them, and allows a user to click on a particular headline which then brings up the respective story. A main tab 701 is selected which indicates that the main window 700 for the current widget is activated. Widgets can play audio, video, still images, text or any other form of content that might be available.

The widget controller also has other functionality as well. A rating bar 703 displays an average rating (e.g., one star to five stars) for the current widget received from users who have used the current widget. The ratings for each particular widget can be tabulated and maintained by the widget administrator. These ratings might be from all users of the widget or from a particular segment of users (e.g. friends of the particular web page owner).

A selection button 705 is used to allow the user to cycle to a next widget. Thus, by pressing the selection button 705, the current widget is changed to another widget (a next widget in the widget set for this widget controller).

A rate it button 702 allows the user (either page owner or visitor) to enter a rating for the current widget, which can then be transmitted to the widget administrator and tabulated. The person rating the widget may, either alternatively or additionally, provide a comment regarding the widget. An add it button 704 is used by a user in order that the user can be prompted for information in order to add the particular current widget to the user's own web page or pages (if, for example, the user has multiple social networking pages). If the user does not already have a widget controller installed on his or her web page(s), then the add it button 704 can also first automatically install the widget controller on the user's page first (as described herein), and then the particular widget the user wants to get can be added to that widget controller.

A forward it button 706 will prompt the user for a friend's email address so that the widget administrator can email a link to the current widget to the friend so the friend can experience the current widget and potentially add it to his or her own web page. When adding the particular widget, the friend may be prompted to download the widget controller, if the person does not have one yet.

A widget controller install button 708 is used to initiate installation of the widget controller on the user's own web page. The widget controller install button 708 would prompt the user for his or her web page information, identification (optional), password, and any other related information. A widget controller would then be associated with given web page and initialized, so that whenever that web page is displayed (wherever that page is displayed across the Internet) the widget controller will now activate and display the respective widget set for the controller for that web page.

An advertising area 707 is used to display advertisements. The advertisements can be customized for the current widget, for example if the current widget is a stock ticker the advertisement can be for a stock-related magazine. Such targeting should typically increase the effectiveness of such ads.

Alternatively, the advertisements displayed in the advertising area 707 can also be targeted based on information from the web page itself that is displaying the widget controller. For example, if the web page is related to cars, then ads in the advertising area 707 can be for new cars. Keywords can be scraped from the web page in order to determine a theme of the web page, upon which appropriate ads can then be served. Advertisements may be targeted based on a combination of factors including what is on the web page itself in addition to what other widgets are associated with the widget controller.

FIG. 7B is an example of a widget controller displaying a search operation, according to an embodiment.

In FIG. 7B, the search tab 710 is pressed, which brings up a search display which allows the user to search for new widgets. A search box 712 is used so the user can enter search terms for a widget he or she is looking for. In this example, the user is looking to add a weather widget to the user's widget controller. Once search terms are entered, search results 716 are returned, in a similar fashion to commercial search engines. In addition, a widget provider can also pay to advertise their widgets based on search terms, similar to how commercial search engines handle pay per click advertising. Thus, a sponsored advertisement 714 appears based on the search term (weather), in which if the user clicks the sponsored advertisement 714, the advertiser will typically be charged a cost per click. There are also advanced search options that allow users to search for widgets based on narrowing elements such as date created, category of widget, ratings, etc.

There can be user ratings/comments available for certain widgets. The user can have the ability to preview a widget so the user doesn't have to add it until he or she has tried it. If the user decides he or she wants a particular widget, the functionality will differ depending upon whether the user is the page's profile owner or if the user is a visitor to the page. Owners of a page hosting a widget controller can simply add a particular widget to their lineup. A subscriber to the widget administrator would typically have a user name/password which can simply be entered and the desired widget will be added to the next "blank" spot on the lineup of the subscriber's widget controller.

If the system doesn't recognize the person requesting the widget, then the owner will be prompted for which of their social networking sites they'd like to add the widget to and applicable username and passwords (if they already have a widget controller). If they do not have a widget controller on the desired target sites, then they can add the widget controller a described herein. The widget controller can also have a "preview pane." Users can scroll through different widgets and preview each widget without actually adding it to the lineup (i.e., adding it to the widget controller). In certain embodiments, this previewing capability is an integral element of the widget controller. The user (visitor or page owner) can go to a previewing pane of the widget controller. On this previewing pane, widgets that might be of interest to the user are automatically downloaded to the widget and can be tested for some period of time. The system to provide preview widgets is described below. In the preview pane the user can interact and use the widget as one would normally do so that the user can test out the widget to see if he or she wants to add it. To add a widget, a user might select on an "add it" button 704. The user can also forward the widget (or a link thereto) by selecting the "forward it" button 706.

The previewing system is set up to allow publishers of widgets to gain greater distribution for their widgets. Through a previewing pane, a user can review suggested widgets for possible addition to their widget controller. These previews may be provided to deployed widget controllers free of charge to the widget publisher or the widget publisher may pay for the right to have their widgets put on the preview rotation for deployed widget controllers. This pay for preview system may be accomplished through auctioning time slots or paying for heavier rotation among all widgets vying for preview distribution.

FIG. 7C is an example of a widget controller displaying a lineup operation, according to an embodiment.

A lineup tab 720 is pressed which brings up a list 722 of the current widgets for the widget controller. A user of the widget controller that is viewing the widget controller from a page he has no control over may have (depending on the configuration) complete, some, little, or no control over the widget set in a widget controller for that web page.

An owner of a web page that hosts a widget controller can typically have control over the widget set for the widget controller. The owner can identify himself or herself to the widget controller by entering their username/password to gain administrator access (if not already recognized as the owner), and once such access is granted, the owner can then adjust the widget set as he or she desires. The widget administrator (or other component in the system) can track and store widget popularity (e.g., ratings, usage data, etc.) Widget popularity can be measured relative to other widgets. For example, if a particular web page has widget A from developer X and widget B from developer Y, data relating to which of these widgets has performed better can be maintained. For example, widget A is recorded to have gotten 75% of use on the same page while widget B has gotten only 25% of the use. This information can be used by the widget manufacturer in order to sell its own widgets or to determine whether particular widgets are successful. For example, a widget developer may advertise that their widget has higher ratings than all other widgets of that kind or the developer may use the data to understand what aspects of a widget make it popular and utilize that information in development of additional widgets. Developer X may advertise that their widget A outperforms widget B from developer Y and provide statistics (e.g., rating data, usage data, download requests, etc.) to back up the claim.

Another measure of a widget's popularity (or success) is its longevity, e.g., the amount of time the widget stays active (on either desktops and/or widget controllers). A widget which is being used relatively frequently will likely not be removed from its respective widget controller (either automatically or manually), while a widget that is not being used very much is more likely to be removed from a widget controller's widget set (either automatically or manually). For example widget C that stays active (part of an available widget set on a respective widget controller) on widget controllers for an average of 30 days would be considered more popular then widget D that stays active on widget controllers for an average of 5 days.

Widgets can be ranked according to criteria such as: rating, usage, longevity, performance relative to other widgets on a same page, performance relative to other widgets in a respective widget set on the same widget controller, or any other metric that the widget administrator (or other component of the system) can track and tabulate. A web site can list the most popular widgets (using real time data) and provide the opportunity for users to automatically retrieve any of the widgets (either for free or purchase depending on the developer's choice).

If a visitor of a web page is not the owner of the page, typically the user will not be allowed to directly change the widget set for the widget controller on the web page. However, usage characteristics by the visitor can still affect the widgets that the widget controller may ultimately contain, as described herein.

In the lineup display the user can also arrange widgets by genres, favorites, widget developers, widget sponsors, date added, category, or any other criteria related to the widgets. The owner may also rename the widgets with titles that may be more appealing or recognizable to him or her.

Widgets can also be arranged in channels or partitions. A channel or partition is a particular identifier of the widget which can be used to retrieve/identify particular widgets. For example, a widget can have 5 channels or partitions, numbered from one to five. Channel one (or partition one) can comprise game widgets, while channel two can comprise widgets related to sports, etc. Therefore, a user of a widget can easily pick a widget he or she wishes to use by first going to a particular channel (or partition) representing a category of widget the user wishes to use.

Not pictured is an archive tab which allows the owner of a widget controller to see widgets he or she has deleted, or widgets that the user has previewed over a predetermined period of time (e.g., last 90 days). The previewing function can have a great deal of flexibility. For example, a widget can be provided for preview for a set period of time (e.g. week, month, day, etc.), set amount of usage (e.g. 10 uses), etc.

Figure 8:
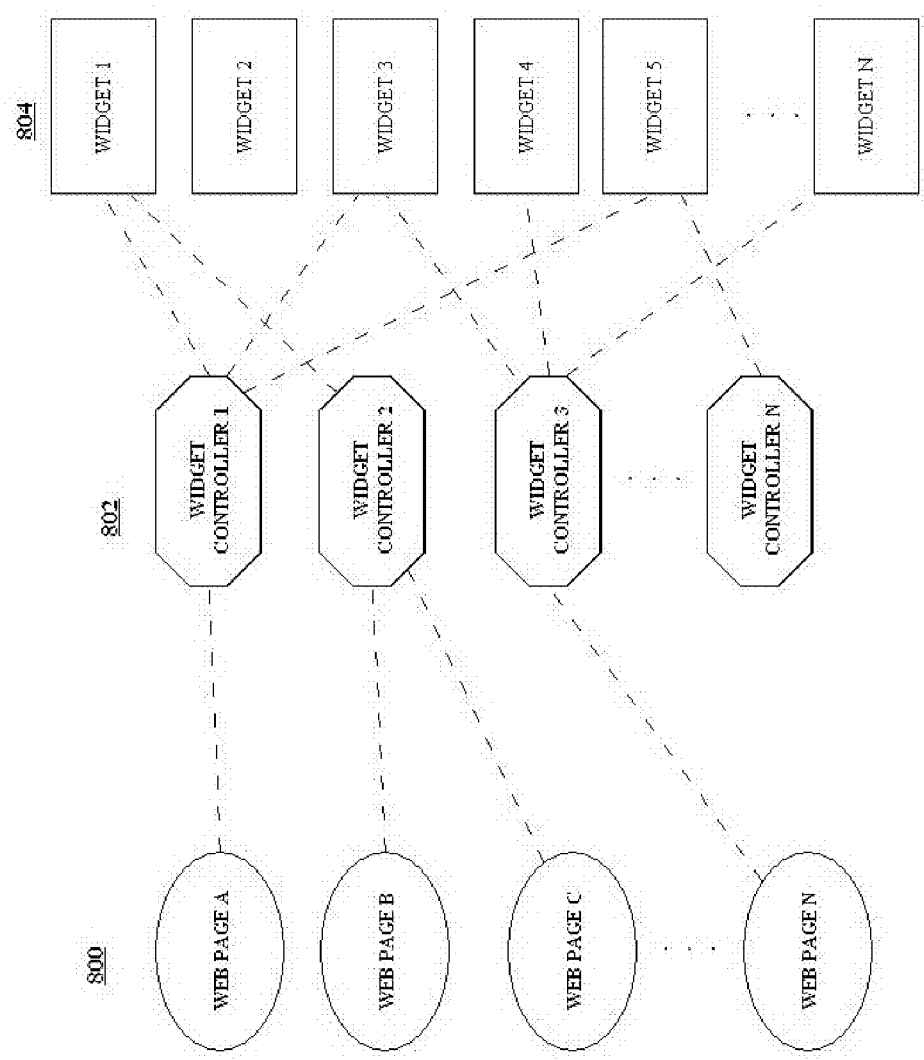
FIG. 8 is a relational diagram illustrating relationships between web pages, widget controllers, and widgets.

FIG. 8 is a relational diagram illustrating relationships between web pages, widget controllers, and widgets.

FIG. 8 shows a plurality of web pages 800, a plurality of widget controllers 802, and a plurality of widgets 804. Each web page can be associated with one widget controller (in a less preferred embodiment a web page can be associated with more than one widget controller). It is noted that multiple web pages can be associated with the same widget controller. For example, John smith might have a web page on two different social networking sites, yet would be able to use the same widget controller on both of his pages. However, John Smith may want to have different widget sets on widget controllers of both of his pages. He may also want to be prompted when associating a widget with one of this widget controllers whether he wants the newly associated widget to be associated with other of his widget controllers.

Each widget controller is associated with any number of actual widgets. The widget(s) that are associated with a widget controller is referred to as the controller's widget set.

Thus, for example, web page B and web page C are both associated with widget controller 2 which only has widget 1 in its widget set. Thus, when web page B and web page C are displayed, both display only widget 1.

The web pages 800 can be stored and served on web servers, e.g., 611 from FIG. 6. The widget controllers 802 "exist" as code which is embedded into the web pages 800, and hence transmitted and displayed to the end users' computers (e.g., 602, 604, 606, 610 from FIG. 6). The original code for the widget controllers 802 can be served from the widget administrator 616 to the end users.

Although some aspects of the code can also be stored and executed on the end users' computers, the widgets 804 actually exist in numerous forms. They can exist as program files. When they are embedded into a web page they are "pointed to" by that web page. When they are actually being displayed, the widget comes to life on a display area of an end user's computer. The widgets as program files can be stored anywhere, e.g., end users 602, 604, 606, 610 widget servers 612, 613, the widget administrator 616, and web site server 611. Typically, the widgets as program files can be stored on widget servers 612, 614, where they can then be served to requesters. Each widget server can be maintained by the company that produced its particular widgets. The widget administrator 616 can also store a local copy of all widgets it operates with, obviating the need to download widgets from the widget servers (unless the widget is a new widget).

In a further embodiment, widget providers can update their widgets which can then be automatically updated to the widget controllers to which prior versions of such widgets are associated. For example, ACME Weather Inc. provides a weather widget that is associated with thousands of widget controllers on thousands of web pages. ACME Weather decides to make an updated version of their widget with increased functionality. ACME Weather can simply transmit the updated weather widget to the widget administrator. When a page embedding a widget controller is newly displayed, the widget controller will communicate with the widget administrator to determine the associated widgets. The newer version of the weather widget will now be downloaded to the widget controller (instead of the older version) automatically and included on the respective widget controller. In this manner, when a user adds a particular widget to his or her web site (via a widget controller), and the provider of the particular widget decides to update the widget, the update is done automatically and web pages that were associated with the older version will automatically be associated with the newer version of the widget. This can be done by completely replacing the code of the older version with the new version, or by using a new identifier for the newer version and automatically identifying associations to the older version and changing these associations to the newer version. There are other approaches available to achieve the same outcome.

In a further embodiment, targeted advertisements can be displayed inside an advertising area (such as advertising area 707) inside a widget controller. Targeted advertisements are advantageous over generic advertisements because targeted advertisements would typically have a higher conversion rate. A number of different sources of information can be used to determine a targeted advertisement, such as text contained in the page containing the widget controller.

FIG. 9A is a flowchart illustrating an exemplary method of displaying targeted advertisements on a widget controller, according to an embodiment.

The method can begin with operation 900, which identifies the web page that contains the widget controller (the host page). The widget administrator contains a database of associations of web pages and widget controllers.

From operation 900, the method can proceed to operation 902, which scrapes text from the host web page and analyzes the scraped text. Text scraping involves parsing the html (or other markup language) of the page to determine words on the page. Text scraping can also entail using optical character recognition to recognize words on the page. Once words on the web page are isolated and identified, they can be run through a filter to determine categories for each word and hence the strongest category on the page. Thus, for example, if words on a web page comprise "auto," "car," "cat," "engine," three out of these four words would fall under the category of automobiles while one of these words would fall under the category of pets. Since cars has more associated words, the web page can then be categorized as one related to automobiles. Such categorizing of web pages is known in the art and can be accomplished in numerous ways.

From operation 902, the method proceeds to operation 904, which determines a targeted advertisement. The targeted advertisement can be determined based on the category of the web page. For example, for each category, a list of potential advertisements/advertisers can be maintained.

From operation 904, the method can proceed to operation 906, which serves the targeted advertisement to the widget controller on the web page. The widget controller is adapted to receive targeted ads from sources such as the widget administrator.

From operation 906, the method proceeds to operation 908 which displays the targeted advertisement in the widget controller so the user of the widget control can view the advertisement. The advertisement may contain a hyperlink such that when the user clicks the hyperlink, either another window will pop up with a web site related to the advertisement or another widget can be displayed in the widget controller related to the targeted advertisement.

In addition to determining and displaying targeted advertisements, targeted widgets can also be determined and served to a user associated with a widget controller. For example, if a page relates to baseball, then a baseball widget (e.g., one that displays highlights of the week's games) can be automatically included on the page's widget controller (or be provided as a widget to be "previewed" widget.

FIG. 9B is a flowchart illustrating an exemplary method of displaying targeted widgets on a widget controller, according to an embodiment.

The method can begin with operation 910, which identifies the web page that contains the widget controller (the host page). The widget administrator contains a database of associations of web pages and widget controllers.

From operation 910, the method can proceed to operation 912, which scrapes text from the web page and analyzes the scraped text (or other method of determining the nature of content on the web page). Text scraping involves parsing the html (or other markup language) of the page to determine words on the page. Text scraping can also entail using optical character recognition to recognize words on the page. Once words on the web page are isolated and identified, they can be run through a filter to determine categories for each word and hence the strongest category on the page. Thus, for example, if words on a web page comprise "auto," "car," "cat", "engine," three out of these four words would fall under the category of automobiles while one of these words would fall under the category of pets. Since cars has more associated words, the web page can then be categorized as one related to automobiles. Such categorizing of web pages is known in the art and can be accomplished in numerous ways.

From operation 912, the method proceeds to operation 914, which determines a targeted widget. The targeted widget can be determined based on the category of the web page. For each category, a list of potential widgets can be maintained. For example, for web pages relating to football (e.g., the web page is determined to be in the "football" category, one or more football widgets can be associated with this category and can be served to the embedded widget controller (identified in operation 910).

From operation 914, the method can proceed to operation 916, which serves the targeted widget to the widget controller on the web page. The widget controller is adapted to receive targeted widgets from sources such as the widget administrator. The targeted widget can appear as the "front" (visible) widget when served, or it can be served as a widget in which the user will have to manually select from the widget controller to use. Instead of one, there can also be multiple widgets served for preview at any given time and there can even be a category within the lineup for "recommended widgets for preview."

From operation 916, the method proceeds to operation 918 which displays the targeted widget in the widget controller so that the user of the widget control can use the targeted widget. This could happen if the targeted widget is served to be the front widget or the user of the web page selects to display the targeted widget.

Figure 9:
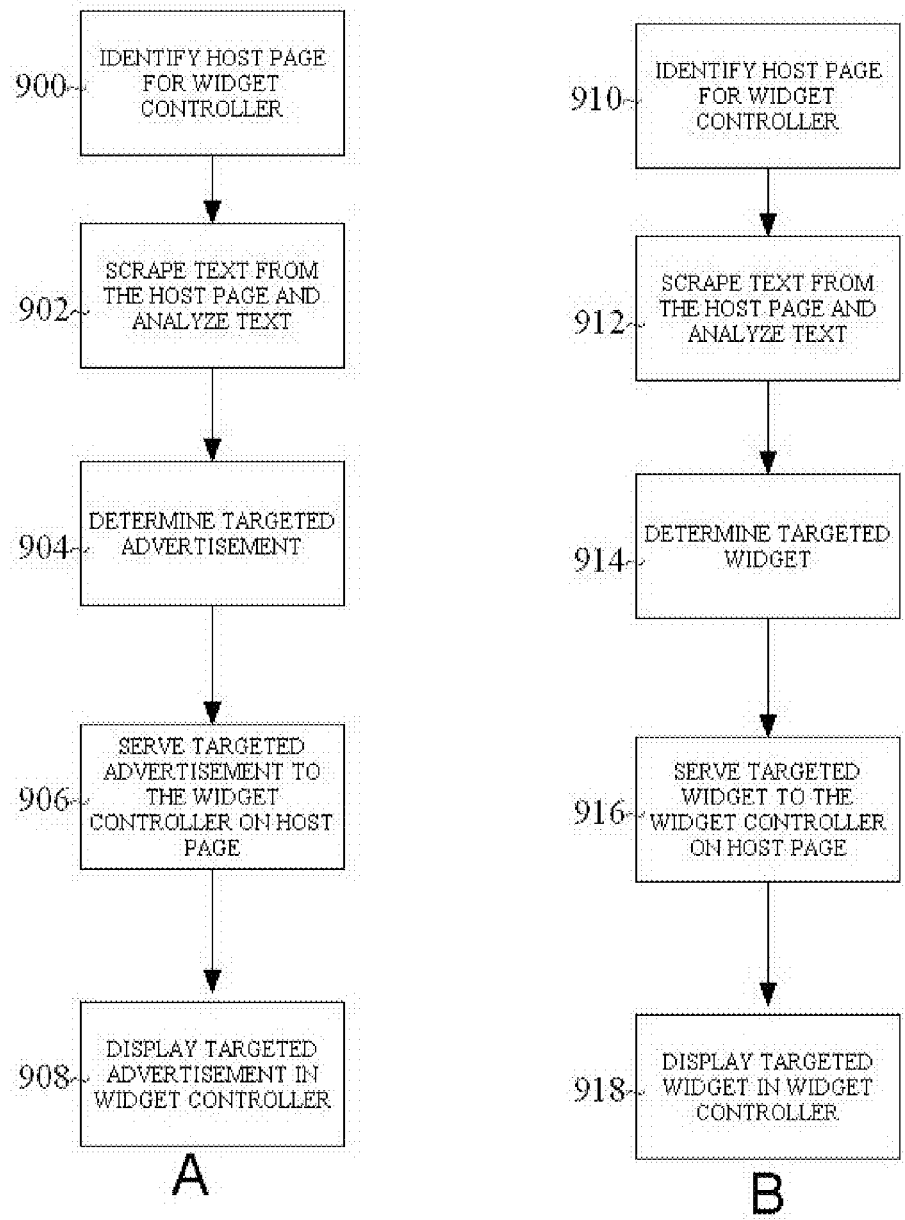
FIG. 9A is a flowchart illustrating an exemplary method of displaying targeted advertisements on a widget controller, according to an embodiment.
FIG. 9B is a flowchart illustrating an exemplary method of displaying targeted widgets on a widget controller, according to an embodiment.

FIG. 9 relates to determining targeted advertisements based on text contained on the web page itself. It can be appreciated that the methods illustrated in FIG. 9 can be adapted to determine and serve targeted advertisements based on a myriad of data, including: the current widget being used on the widget controller; widget usage history of the widget controller on a particular web page; ratings given to particular widgets by current users of the widget controller; demographic data of the current user of the widget controller; demographic data of the owner of the web page containing the widget controller; text contained in pages associated with the web page containing the widget controller (one example of an association can be friends' pages), or any combination of this information.

Using associated pages can be helpful in determining a targeted advertisement and/or widget to automatically choose. Associated pages can be pages which are identified as 'friends' to the web page hosting the widget controller (the host page). Associated pages can also be identified as parties which have left comments on the host page or pages owned by parties that have viewed the host page. Associated pages are relevant because people associated with the host page will likely be visiting the host page, and hence, operating the embedded widget controller embedded in the host page. Therefore, information from these host pages can be relevant in determined targeted content (e.g., advertisements, widgets, or other targeted media).

Figure 10:
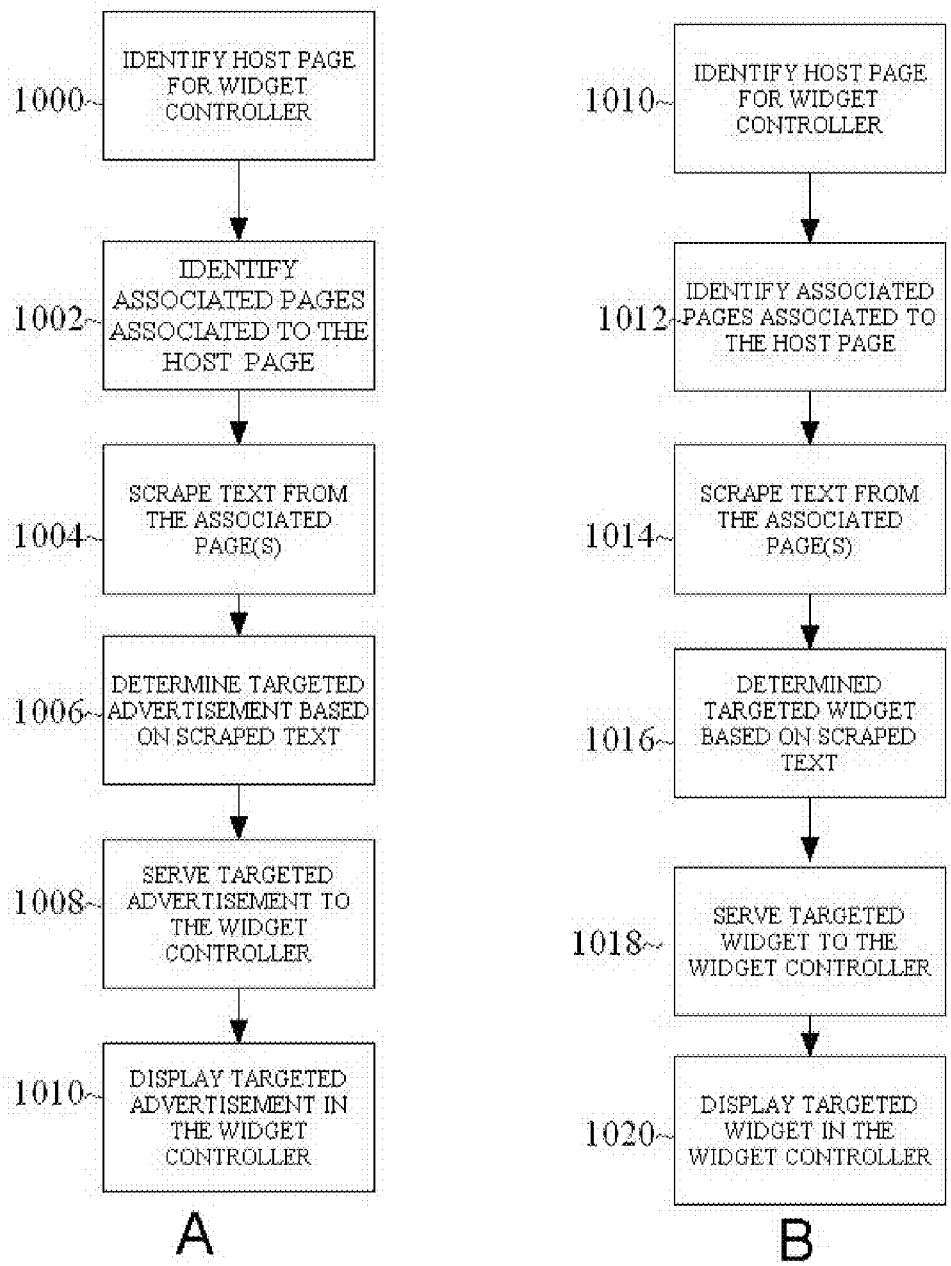
FIG. 10A is a flowchart illustrating an exemplary method of displaying targeted advertisements on a widget controller using associated pages, according to an embodiment.
FIG. 10B is a flowchart illustrating an exemplary method of displaying targeted widgets on a widget controller using associated pages, according to an embodiment.

FIG. 10A is a flowchart illustrating an exemplary method of displaying targeted advertisements on a widget controller using associated pages, according to an embodiment.

The method can begin with operation 1002, which identifies a host page for the widget controller.

From operation 1002, the method can proceed to operation 1002, which identifies associated pages to the host page. This can be done in numerous ways. Associated pages can be "friends" pages to the host page which can be ascertained by querying the social networking site itself. Alternatively, the host page may list the friends directly on the host page, which can be scraped and thus the friends can be determined. Associated pages can also be defined as pages that link to the host page, which can be determined from the social networking site itself or even from commercial search engines which can display pages which link to another page. A user may even provide the links to friends pages or the names/email addresses of friends' pages. Associated pages can also be identified by examining the messages left on the host page by other users and looking at the personal pages of the other users. The identified associated pages can be stored in a queue (or other data structure).

From operation 1002, the method can proceed to operation 1004, which scrapes text from the associated pages. This can be done as described herein.

From operation 1004, the method can proceed to operation 1006, which determines a targeted advertisement based on the scraped text. This can also be done as described herein. The scraped text can come from pages associated with the host page and also (optionally) the host page itself to determine one or more relevant categories.

From operation 1006, the method can proceed to operation 1008, which serves the targeted advertisement to the widget controller, wherein the targeted advertisement can then be displayed in operation 1010 The widget administrator can also store a plurality of suggested advertisements. For example, for weather widgets, a number of different advertisements can be stored, e.g., "check today's weather here," or "plan ahead with this weather widget." Data can be tabulated as to the conversion rates for each advertisement, and this data can be used when selecting one of the suggested advertisements to use when advertising a particular widget.

FIG. 10B is a flowchart illustrating an exemplary method of displaying targeted widgets on a widget controller using associated pages, according to an embodiment.

FIG. 10B is similar to the method illustrated in FIG. 10A, but instead of determining and serving a targeted advertisement, a targeted widget can be determined and served. The targeted widget can be determined from the category of scraped pages as described with respect to operation 914.

The widget administrator can collect, store, and tabulate data for each widget. Such data can be any type of data described herein, such as demographic data. For example, an average age of users of a widget can be computed. This can be done in numerous ways. When owners of widget controllers sign up, they may be prompted for their demographic data such as their age. When a visitor visits a web page that embeds a widget controller use, the visitors age (or other demographic data) might be ascertainable by a cookie or other identifier. The visitors approximate location can be ascertained by the visitor's IP address. Thus, for each widget, demographic data of its users can be collected.

Advertisements can then be targeted based on that demographic data. For example, the database administrator might have the following suggested advertisements: 1) baseball scores now!; 2) Yankee fans need this widget!. If a large contingent of users of the particular widget to be advertised are identified as being from New York, then the second suggested ad can be selected. Thus, a selected ad can be chosen out of a plurality of suggested ads based on demographic data that the system knows about the users of the particular that is to be advertised. Different advertisements can be stored along with demographic data suggested for each respective advertisement. Thus, when it is time to determine an ad, the demographic data for users of the particular widget to be advertised is compared with the suggested demographic data, and the suggested advertisement with the best match will be chosen.

TABLE III

| Suggested advertisement # | text | preferred age |
|---|---|---|
| 1 | "magic predictions" | <=15 |
| 2 | "find love now" | 15 > 25 |
| 3 | "get ahead in life" | 25<= |

Thus, for example, in Table III, three different suggested advertisements are shown for a horoscope widget which can display the user's horoscope given their birthdate. There can be many different horoscope widgets all by different developers. Each widget might have a different demographic that it is successful with, for example, some widgets may have graphics which cater to children. In table III, the first suggested advertisement, "magic prediction" is suggested for widgets have users with an average age of 15 or less. The second suggested advertisement, "find love now" is suggested for widgets which have users with an average age between 15 to 25. The third suggested advertisement, "get ahead in life" is suggested for widgets which have users with an average age of 25 or greater. The suggested age ranges can themselves be determined by analyzing conversion rates for the different ads and the demographic data of the users which have purchased the product. Thus, knowing the average age of the users of a widget that is to be advertised, then a suggested ad can be determined using this data. In addition to age, any other demographic data of users can be used when determining the advertisement, as described herein.

Figure 11:
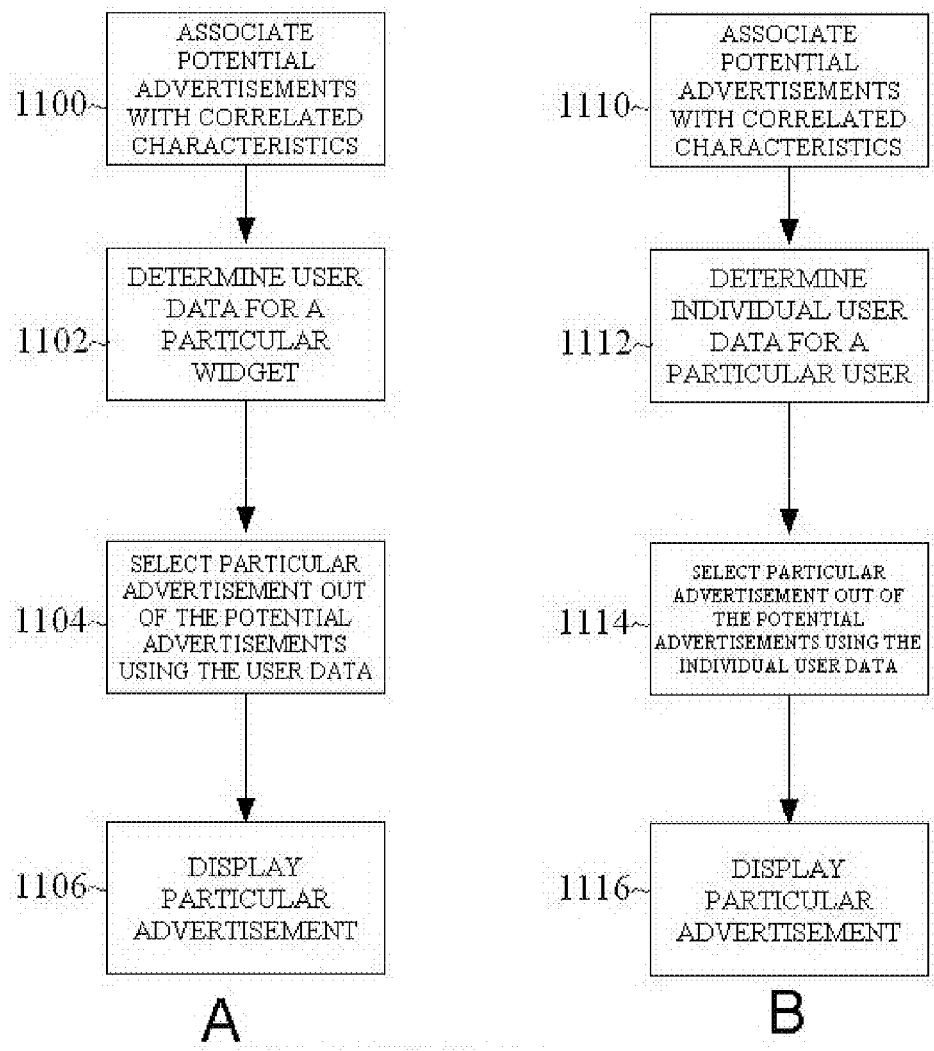
FIG. 11A is a flowchart illustrating an exemplary method of selecting a targeted advertisement based on widget usage data, according to an embodiment.
FIG. 11B is a flowchart illustrating an exemplary method of selecting a targeted advertisement based on user data for a particular user, according to an embodiment.

FIG. 11A is a flowchart illustrating an exemplary method of selecting a targeted advertisement based on widget usage data, according to an embodiment.

The method can begin with operation 1100, which associates potential (e.g., suggested, pre-stored, etc.) advertisements with correlated characteristics (e.g., demographic data, etc.) Table III is an example of this association. Different ads can have different characteristics of readers that are deemed most effective. The characteristics can be determined using historical data (based on users who successfully purchased a product from seeing the ad) or can even just be predicted by the operators.

From operation 1100, the method can proceed to operation 1102, which determines user data for a particular widget. The particular widget can be served to users using any method as described herein. Data relating to the users of the widget can be tracked. A user of a particular widget can be defined as a visitor to a web site who actually uses the particular widget. The user might have selected the particular widget out of other widgets on a widget controller, although this may not be required.

The data of users using a particular widget can be any characteristic described herein, e.g., age, location, sex, income, or any data that might be available to the system (e.g., the widget administrator).

From operation 1102, the method can proceed to operation 1104, which selects a particular advertisement out of the potential advertisements (in operation 1100) using the user data for the particular widget (from operation 1102). Thus, knowing the type of users who like a particular widget, an ad can be selected from a "clearinghouse" of ads based on the particular widget's typical user (e.g., their average age, etc.)

The method can proceed to operation 1106, which displays the particular advertisement when advertising the particular widget. In this manner, the particular advertisement would better appeal to the typical users of the particular widget. The particular advertisement can be displayed in any context (including, but not limited to the contexts described herein). For example a widget controller search operation (see FIG. 7B), a widget controller advertising area 707, on non-widget controllers (e.g., regular web pages, regular search engine results, etc.)

The method in FIG. 11A determines empirical user data for a particular widget and then determines an advertisement to serve to users. This may work relatively well if the system does not know data about the individual recipients of each advertisement, and thus a generic advertisement is determined to serve to a number of users.

Alternatively, a system can be implemented by which targeted advertisements can be tailored to the actual particular end user. This method would require that the system know some data about the end user, and may result in better results than the method illustrated in FIG. 11A.

FIG. 11B is a flowchart illustrating an exemplary method of selecting a targeted advertisement based on user data for a particular user, according to an embodiment.

The method can start with operation 1110, which associates potential advertisements with correlated characteristics. This is done similarly to operation 1100.

The method can proceed to operation 1112, which determines individual user data for a particular user. This can be data relating to a particular user (e.g., one person currently using a web browser on his or her computer and operating a widget controller on a web page) of a widget controller (e.g., the particular user's age, location, etc.) which can be determined in a number of different fashions (e.g., cookie, the user's registration to the system, IP address, etc.)

From operation 1112, the method can proceed to operation 1114, which selects a particular advertisement out of the potential advertisements (in operation 1110) using the individual user data for the particular widget (from operation 1112).

From operation 1114, the method can proceed to operation 1116, which displays the selected particular advertisement in operation 1114 to the particular user. In this manner, the selected particular advertisement should typically be more effective since it is targeted to the individual end user. The particular advertisement can be displayed in any context (including, but not limited to the contexts described herein). For example a widget controller search operation (see FIG. 7B), a widget controller advertising area 707, on non-widget controllers (e.g., regular web pages, regular search engine results, etc.)

It is further noted that any of the advertising methods described herein can be combined with one another, and any operations or data considered by one method can be used to augment another method as well.

In a further embodiment, targeted widgets can be automatically served and included in a user's widget controller. For example, if an owner of a web page which contains a widget controller has a preference for sports, then periodically (e.g., every week), a new sports widget can be served to the user's widget controller and included therein.

Figure 12:
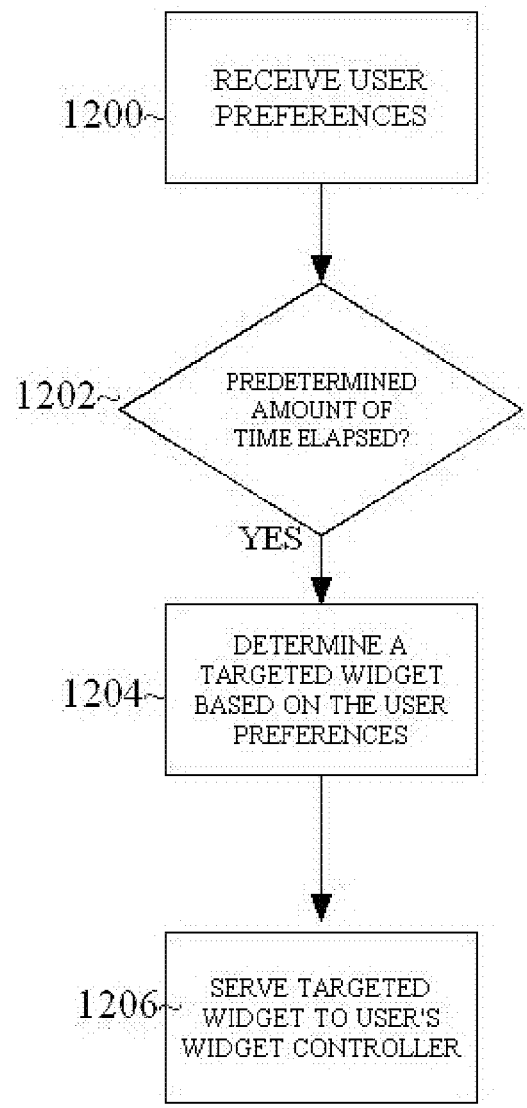
FIG. 12 is a flowchart illustrating an exemplary method of determining a particular widget to serve to a widget controller, according to an embodiment.

FIG. 12 is a flowchart illustrating an exemplary method of determining a particular widget to serve to a widget controller, according to an embodiment.

The method can start with operation 1200, which receives the user preferences. When a user first installs a widget controller onto the user's web page, the user can be presented with a questionnaire asking what types of hobbies the user likes, or any kind of demographic data. This data can be stored in the widget administrator. In addition (or as an alternative to) a questionnaire, data can be ascertained about the user based on the content of the user's web page. For example, as discussed above, text can be scraped from the web page to determine a category or type of the web page. For example, if based on words on the page the category of the page is determined to be "computers," then it can be assumed that the user is interested in computers.

From operation 1200, the method can proceed to operation 1202, which determines whether a predetermined amount of time has elapsed. For example, a new widget can be served to a widget controller each day, week, month, etc.

If the determination in operation 1202 determines that a predetermined amount of time has elapsed, then the method proceeds to operation 1204, which determines a targeted widget based on the preferences identified in operation 1200. Of course, the order of these operations is not limited to as illustrated, as the preferences can also be determined after the predetermined amount of time has elapsed. In other words, if the user changes his or her web page, whenever a new targeted widget is to be determined the current version of the web page can be used in determining the user's preferences.

From operation 1204, the method can proceed to operation 1206, which serves the targeted widget to the user's widget controller. The targeted widget can be added to the widget controller or it can replace an older widget. For example, each week a new targeted widget can be served to a widget controller which would replace the previous week's targeted widget. There can also be more that one targeted widget served to a widget controller at a time.

Examples of such weekly widgets can be, for a user who likes movies, each week a new widget containing information, clips, show times, etc., about a recently released movie can be served to such a user. For a user who is interested in basketball, a weekly widget can be served to the user's widget controller containing information about the week's upcoming basketball games.

Examples of such weekly widgets can be, for example, a basketball widget category. One week the basketball widget is a game that lets the user shoot hoops, the next week it could be a widget that shows clips from the last week's games, and then the next week the basketball widget could display a lottery contest awarding the winner free tickets to a particular basketball game.

Widget usage can also be tracked and new targeted widgets can be determined and served based on the usage data.

Figure 13:
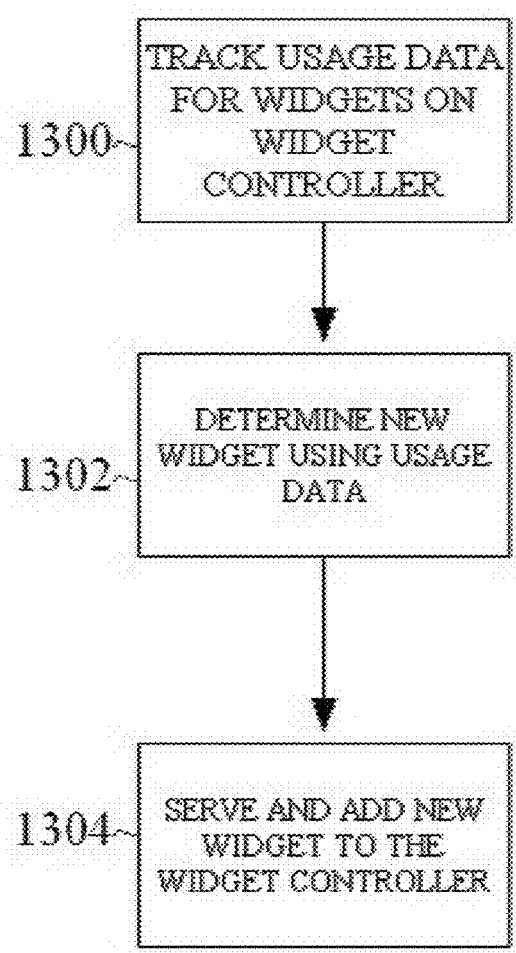
FIG. 13 is a flowchart illustrating an exemplary method of determining and serving new widgets based on usage data, according to an embodiment.

FIG. 13 is a flowchart illustrating an exemplary method of determining and serving new widgets based on usage data, according to an embodiment.

The method can start with operation 1300, which tracks usage data for widgets on a widget controller. A widget controller can have a widget set of N widgets. The usage data for each of these individual widgets can be tracked. Such usage data can be the elapsed time of use and/or frequency of use, or any other usage characteristics. Such usage data can be absolute or relative to the other widgets of the widget set on the controller.

The usage data would be tracked across all users of a widget controller. Thus, any visitors to a host page with a widget controller would have their usage of the widget controller tracked.

From operation 1300, the method can proceed to operation 1302, which determines a new widget(s) based on the usage data. This can be done in numerous ways. For example, the most frequently used widget on the widget controller can be determined, and then another widget of a same category of the most frequently used widget can be determined as the new widget.

As an example, a widget controller has a set of three widgets, a weather widget, a basketball widget, and a game widget (e.g., Tetris). It is determined that the game widget is getting the most usage out of the three widgets. Thus, another widget of the same category can be a result of the determination. For example, another game (e.g., a space shooting game) can be selected.

In addition to usage data, widget rating data can be also used (either in conjunction with the usage data or without usage data) to determine popular widgets. Each widget can have a ratings bar (see FIG. 7A, 702) which allows users to rate their enjoyment of a current widget being displayed. This rating data can be stored and tabulated to determine the popularity (both absolute and relative) of each widget in the widget set.

Thus for example, the highest rated widgets can then be used to determine a similar new widget to serve and add. Or a formula can be used which combines both usage data and ratings. For example, each widget on a widget set can be ranked both in terms of time (or frequency) of usage as well as ranked based on rating. An average (or some other weighting) can be taken between the two values to determine an overall score for each widget in a widget controller's widget set. The widget with the highest score can then be used as a basis for determining a new widget, while the widget with the lowest score can be replaced with the new widget.

in one embodiment, widgets on each widget set should remain on a widget controller for a predetermined amount of time (e.g., host page views, elapsed time viewed, or other measurement) before it is automatically removed (although in another embodiment, this is not required). This is so each widget can be given a fair chance to receive rating and usage data before it is automatically removed. The waiting period can also be required before a widget is used to determine a new widget as well. However, the owner of a widget controller would typically have full control over the widgets belong to the respective widget set and he or she could manually remove widgets that he or she did not like.

From operation 1302, the method can proceed to operation 1304, which serves the new widget determined in operation 1302 to the widget controller, wherein the new widget is added to the widget controller's widget set. The new widget can simply be added or alternatively it can replace another widget. The widget it replaces can be chosen randomly or can be chosen by some other criteria, such as the widget on the widget controller which is getting the least usage (based on the usage data determined in operation 1300).

In this manner, a widget controller can, with usage by a plurality of users over time, automatically develop a widget set which gets a relatively large amount of usage by the users of the host page containing the widget. Since different host pages will attract different types of visitors, of course automatically determined new widgets for one host page may be completely different than automatically determined new widgets for a different host page.

In yet a further embodiment, subscribers to the widget administrator can optionally choose a channel out of a plurality of channels to subscribe their widget controller to. For example, a WSPR (a fictional sports radio station) can sponsor their own channel or category on the widget controller. After predetermined periods of time (e.g., one week, etc.) a new widget can be served to subscribers of that channel (the new widget can but doesn't have to replace the previous widget for the channel). Each week's widgets would typically contain content which would be appreciated by listeners of the radio station. For example, such widgets could be: football scores, baseball interviews, baseball video game, betting lines on sports, etc. Each week a new widget for the channel would be automatically served to widget controllers which subscribe to the channel. Thus, widgets on a widget controller can automatically change without prompting by the owner of the widget controller (the controller of the web page which embeds the widget controller). A plurality of channels can exist representing different organizations, e.g., sporting organizations, sports teams, radio stations, television stations, magazines, newspapers, multi-player games, etc. Each period, the organization administering their own channel or category would choose the week's widget to be served to their channel subscribers.

Figure 14:
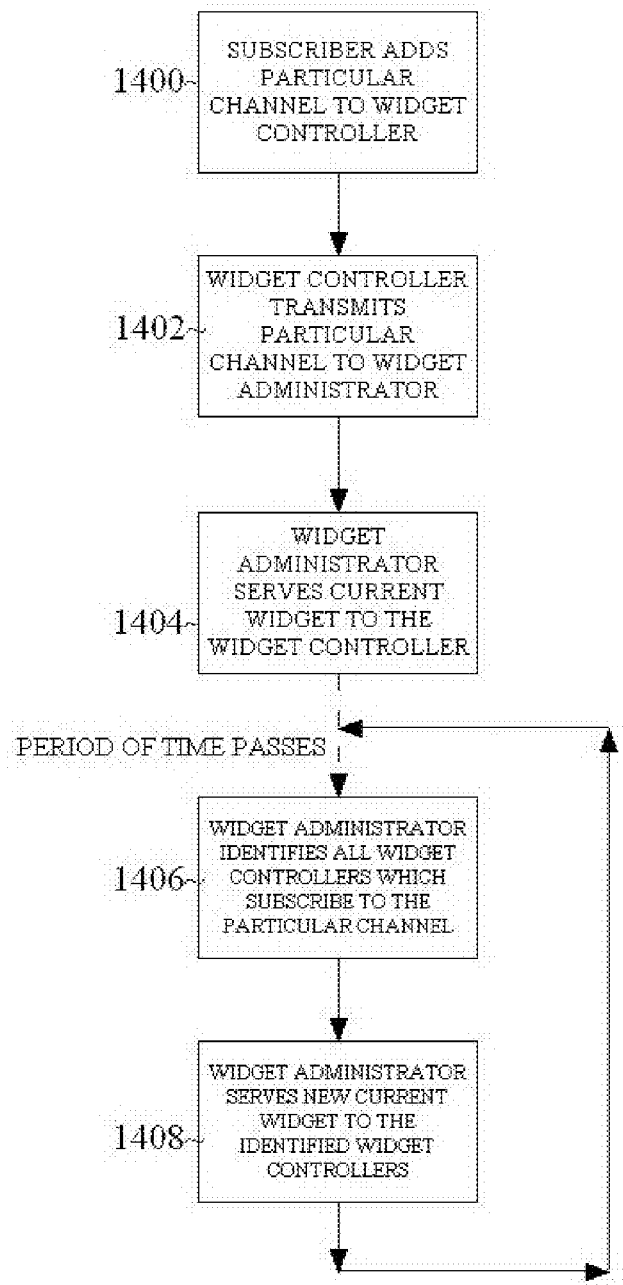
FIG. 14 is a flowchart illustrating an exemplary method of subscribing to a channel and receiving automatic channel widgets, according to an embodiment.

FIG. 14 is a flowchart illustrating an exemplary method of subscribing to a channel and receiving automatic channel widgets, according to an embodiment.

The method can begin with operation 1400, wherein a subscriber (to the widget administrator) adds a particular channel to the widget controller on the subscriber's web page. This can be done in numerous ways, for example, browsing channels on the widget controller and selecting to add a channel by clicking a particular icon.

From operation 1400, the method can proceed to operation 1402, wherein the widget controller transmits the particular channel that the subscriber selected in operation 1400 to the widget administrator. The widget administrator would store in its database the channel subscription by the subscriber so that the subscriber can receive the channels new widgets periodically.

From operation 1402, the method can proceed to operation 1404, wherein the widget administrator servers a relevant widget to the widget controller. Instead of having the subscriber have to wait until the next period to receive a widget for the particular channel, the widget administrator can serve a current widget for the particular channel to the subscriber.

After a predetermined amount of time passes (or a predetermined point in time passes), the method can proceed to operations 1406-1408 which implement an automatic update of a channel's widget. For example, every week, the widget on a widget controller for a particular channel can be replaced by the channels new widget.

In operation 1406, the widget administrator identifies all widget controllers which subscribe to the particular channel. This can be done by querying the database associated with the widget administrator. From operation 1406, the method can proceed to operation 1408, wherein the widget administrator serves a new current widget to the widget controllers identified in operation 1406. The new current widget is selected by the administrators of the respective channel and can be uploaded to the widget administrator by such administrators. The administrators of the respective channel would typically be representatives (employees, owners, mangers, etc.) of the organization sponsoring the channel.

Note that a "channel" as used herein is an identifier which refers to different widgets which have some common aspect. Instead of channel, other identifiers that could be used in its place are "category" or "class." If a user likes a particular category, then he or she is more likely to like widgets falling in that category. For example, if a user voluntarily subscribes to a sports channel, then that user is more likely to enjoy a widget related to golf as opposed to a widget not falling in the channel (or category) such as a widget relating to cooking. This is because the cooking widget does not share the aspect of sports that the golf widget does have.

Described herein is a method wherein given a widget that is successful (e.g., high usage data and/or rating, or other desirable criteria), then another widget can be selected which would be predicted to be successful on the same widget controller. This can be done in a number of ways. For example, widgets can be categorized (e.g., sports, games, etc.), and if a widget is determined to be successful is in one particular category, then another widget can be selected from the particular category (e.g., the highest rated widget in that category, a random widget in that category, or some other determination method). If one widget is successful, then "related" widgets would be predicted to also be successful on the same widget controller.

As another method, widgets can be associated with related widgets. A relation score can also optionally be used to indicate a degree of "relation." In other words, if widget A has a high relation score to widget B, then it is predicted that users of widget A would also like widget B. If widgets B and C have a low relation score, then it is predicted that users of widget B would not like widget C. Of course, these are merely predictions, and what happens in reality may different from theoretical predictions.

Figure 15:
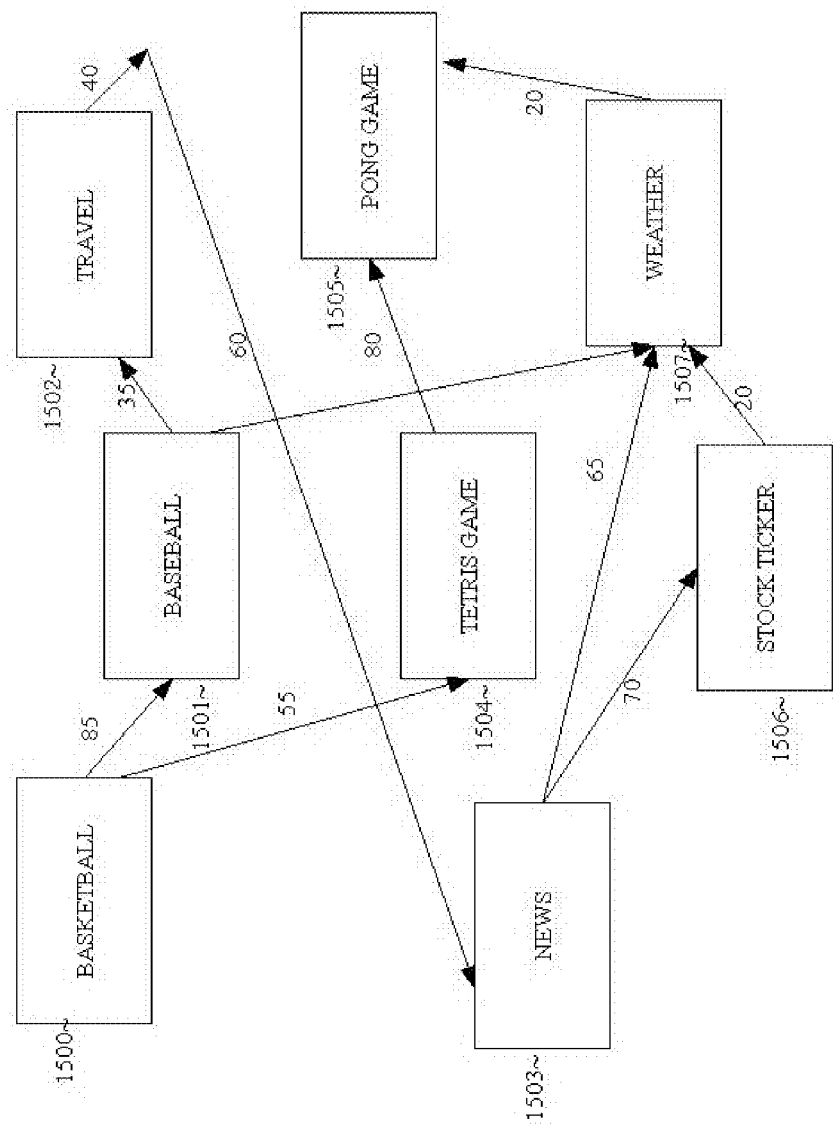
FIG. 15 is an example relational diagram between different widgets and associations to other widgets, according to an embodiment.

FIG. 15 is an example relational diagram between different widgets and associations to other widgets, according to an embodiment. This is merely one example in order to illustrate one method of choosing a widget based on another widget.

Basketball widget 1500 has a relation score of 85 to baseball widget. Note that the relational score in this example ranges from 0-100, wherein 100 represents the highest correlation while 0 represents the lowest correlation. Thus, a score of 100 between a first widget and a second widget means that a user (or group of users) that like the first widget will be extremely likely to like the second widget. A score of 0 between a first widget and a second widget means that users of the first widget will be very unlikely to like the second widget. The scale used herein is merely exemplary, and any numerical scale can be used.

Thus, a user (or group of users) who like the basketball widget 1500 are likely to like the baseball widget 1501 (since the relation score is relatively high at 85). The baseball widget 1501 has a relation score of 35 to a travel widget 1502. This means that user(s) of the baseball widget 1501 may be slightly interested in the travel widget 1502. There is a relation score of 40 from the travel widget 1502 to a news widget 1503. From the basketball widget 1500 there is a relation score of 55 to Tetris game widget 1504 which has a relation score of 80 to a pong game widget 1505. The news widget 1503 has a relation score of 65 to a weather widget 1507 which has a relation score of 20 to the pong game widget 1505. The news widget 1503 has a relation score of 70 to a stock ticker widget 70 which has a relation score of 20 to the weather widget.

In a further embodiment, a relation score can be combined with scraping in order to produce a composite score. For example, if it is determined from scraping that a particular web page has a category of "news," this can information be considered to determine which widget will be selected. If the top two possible widgets based on the relation score are news and travel, and the web page that is to host the new widget has a category of "news" from scraping, then the news widget can be selected. Or, a point amount (e.g., 10 points) can be added to the relation score for news widget(s) before choosing the widget with the highest relation score.

Thus, for example, people who like a widget relating to basketball would be more likely to like a widget relating to another sport (e.g., baseball) rather than a game (e.g., Tetris). Thus, the basketball widget 1500 has a higher relation score to the baseball widget 1501 than the Tetris game widget 1504.

Thus, if a particular widget is successful (has a relatively high frequency of use and/or rating), then an associated widget with a highest relation score (or an associated widget with a relatively high or higher relation score) can be chosen as a new widget to serve to the widget controller hosting the particular widget.

In yet another embodiment, widgets can come in different shapes instead of just the standard rectangular shape illustrated in FIG. 2A. Each particular widget can have its own predefined shape (including both shape and size), and the widget controller can change its shape to accommodate each particular widget's respective size. Different shapes/sizes of widgets can accommodate different themes of each widget as well as taking up as much space as is needed for particular widgets.

Figure 16:
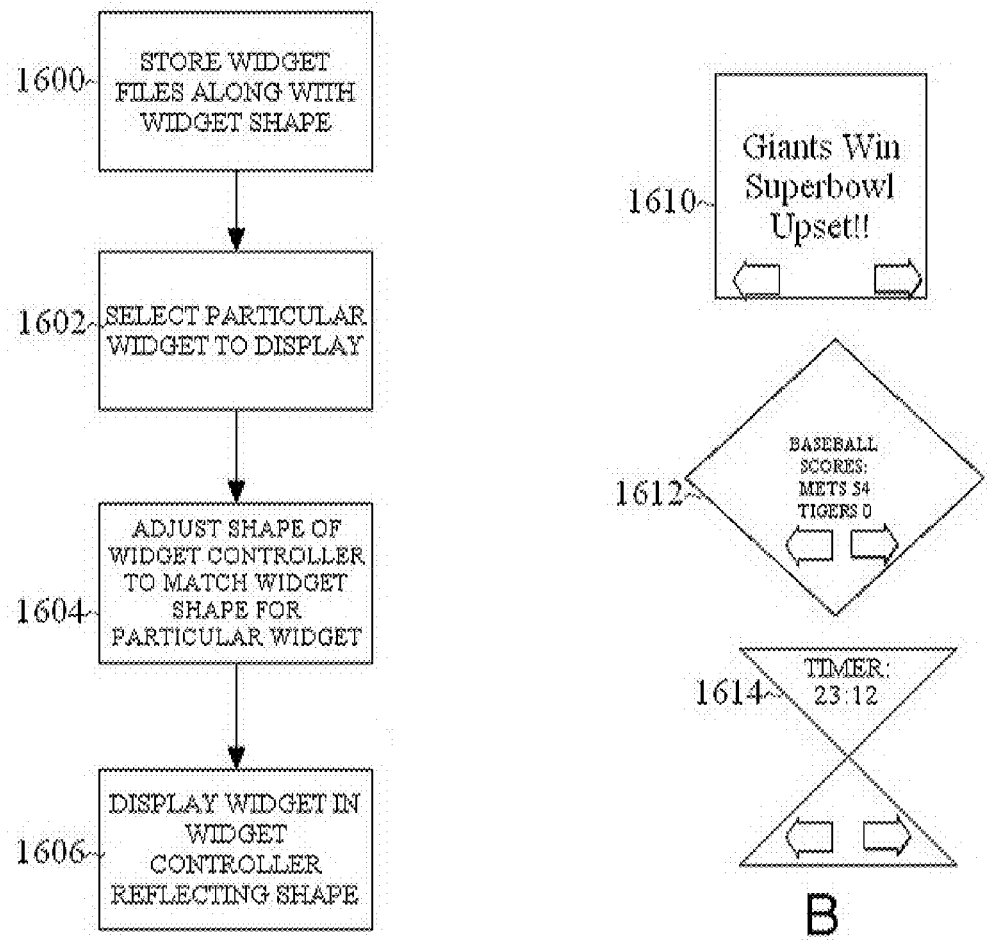
FIG. 16A is a flowchart illustrating an exemplary method to display different widgets in different shapes, according to an embodiment.
FIG. 16B is a diagram illustrating different shapes of a widget wheel, according to an embodiment.

FIG. 16A is a flowchart illustrating an exemplary method to display different widgets in different shapes, according to an embodiment.

The method can start with operation 1600 which stores widget files along with respective widget shapes. Widget files contain the assets (programming, media files, etc.,) needed to display a widget, while shape is the actual shape that widget will be displayed as. The shape can be stored in a number of formats, such as a JPG outline, vector sequence, etc.

From operation 1600, the method can proceed to operation 1602, wherein a particular widget is selected to be displayed. The selection can be performed by a user or automatically, using any of the methods described herein.

From operation 1602, the method can proceed to operation 1604, which adjusts the shape of the widget controller to match the predefined widget shape for the particular widget to be displayed. The code implementing the widget controller on the user's computer can change the display of the widget controller accordingly.

From operation 1604, the method can proceed to operation 1606, which displays the particular selected widget inside the widget controller using the particular selected widget's predefined shape.

FIG. 16B is a diagram illustrating different shapes of a widget wheel, according to an embodiment.

A square widget 1610 illustrates one standard shape for a widget controller. A diamond shaped widget 1612 illustrates a different shape for a widget, in this case the diamond shape coincides with the widget's baseball theme. An hour glass shaped widget 1614 also coincides with the widget's function as a timer. Each of these widgets also has the left/right arrows so that the user can select different widgets in the widget controller's widget set. Upon each new selection of a widget to be displayed, the shape of the widget controller/displayed widget automatically changes.

In yet a further embodiment, widget 'headlines' can be scrolled (or otherwise displayed) across a widget controller in order to advertise other widgets, perhaps not visible at the moment. These can be similar to the targeted advertisements discussed herein which promote other widgets. Thus, a user may see a scrolling ad for a weather widget, and can then click the ad in order to add that weather widget to the user's widget controller. In the alternative, the advertisement may be for another widget already on the widget controller, promoting some content or other feature that may have been recently added to the widget. In this manner, widgets that have been deployed for some time have the opportunity to be viewed as fresh and useful. The widgets selected to be promoted through scrolling across a widget controller can be selected using methods described herein with regard to targeted advertising displayed on widget controllers. For example, if a user is current using a particular category of widget (e.g., sports related), then other sports related widget ads can be displayed (and possible scrolled) across the widget controller so that the user can click the ad to bring up that widget.

Participants to the system can profit from the system described herein in numerous ways.

Some widgets served to the widget controllers can be purchased by the subscribers (who control their own respective widget controller) to use on their web pages. The widget administrator can collect payment for such widgets, and then a portion of such payment can be paid to the original widget developer.

An additional way revenue can be made from the system described herein is as follows. A widget sponsor can pay the widget administrator to serve widgets developed by the widget developer to subscribers. For example, a widget controller can receive a new widget after a predetermined amount of time (e.g., one week). This new widget can be associated with a company (e.g., a television station, etc.) who would pay to get their widget on other peoples' web pages. The widget sponsor can be the party who develops a particular widget, and/or a party who has commissioned the widget to be developed by an outside party on behalf of the sponsor. Even though the sponsor has to pay using this paradigm to get their sponsored widget out on widget controllers, they are hoping to benefit from their sponsored widget. They can benefit from the sponsored widget in many ways, for example, the sponsored widget can serve as advertising for the sponsor, or the sponsored widget can offer goods for sale by the sponsor (or link to such goods). Further, some widgets may be free to try (and may possibly have reduced functionality) but may charge the end user an activation fee in order for the end user to continue using the widget (or use it with full functionality). The widgets added to the widget controller can even embed their own advertising into their widgets.

A further way revenue can be made is when widget developers pay for sponsored listings on the search page. The search page on a widget controller (see FIG. 7B), can operate like a commercial search engine which uses paid sponsors who wish to appear in prominent positions for particular keyword searches. As discussed above, a sponsor can benefit from having their widget used by users in many ways. As such, they may be willing to pay to advertise their widget on the search page so that users can come across their ad, download and add their widget, and use it (or have visitors to the user's page use it).

Another way revenue can be made is from advertising embedded into a widget controller. The advertising area 707 in FIG. 7A can be used (although of course any area on the widget controller can be used for this purpose) to display targeted advertisements. Advertisers will pay the widget administrator an advertising fee, and the widget administrator would in turn serve targeted ads to widget controllers. The advertisers can pay a fee per widget served, e.g., one cent for every widget controller the ad is served on. Typically, the advertisements served would be targeted in order to generate better results for the advertisements. Widgets ads (for other widgets) that are scrolled across the widget controller can also be paid for by developers (or sponsors or any other interested party) for the advertised widget.

Another way to derive revenue is for the provider of the widget controller to share in revenue generated by widget administrators for placement of their widget on the widget controller. In the event that a widget administrator starts placing advertisements within their widgets, a percentage of that revenue (i.e. 20%) can be paid to the company providing the widget controller.

Described herein is a method, system, and computer readable storage medium which can be used to implement a widget controller which is capable of displaying a plurality of widgets sequentially inside the single widget controller. One advantage of this system is that this conserves display space, on a desktop, mobile device or on a web page. Web pages that contain multiple widgets look cluttered up, have less room available for content, and also might be distracting since widgets typically contain visual effects. Thus, the present inventive concept addresses these issues.

A widget controller is also beneficial for use on a cellular phone, mobile or portable device, or other type of PDA/mobile or handheld device which has limited display space. A fixed portion of the output device on a cellular phone can be dedicated to a widget controller.

In a further embodiment, widgets can automatically be updated without the end users (owners of web pages hosting widget controllers, visitors of those web pages, or owners of desktops having a widget controller) having to take any active steps themselves in order to update the widgets. For example, a widget developer may come out with a new version of a widget in order to fix bugs or just to make improvements, as is commonly done with software. In the embodiment as illustrated in FIG. 4B, updating can be done automatically since each time a web page is loaded with a widget controller, the widget controller will see which widgets it is to display (the current widget set) and download those widgets.

However, in a further embodiment, widgets that have previously been downloaded may not necessarily have to be downloaded again, saving download time. This may especially be important in the mobile context, since bandwidth and even connectivity time may be limited.

Further embodiments can automatically update widgets, which can be used for example in a system wherein each widget is not always downloaded every time it is used. An automatic updating method can be performed, in which widgets are updated when needed.

Figure 17:
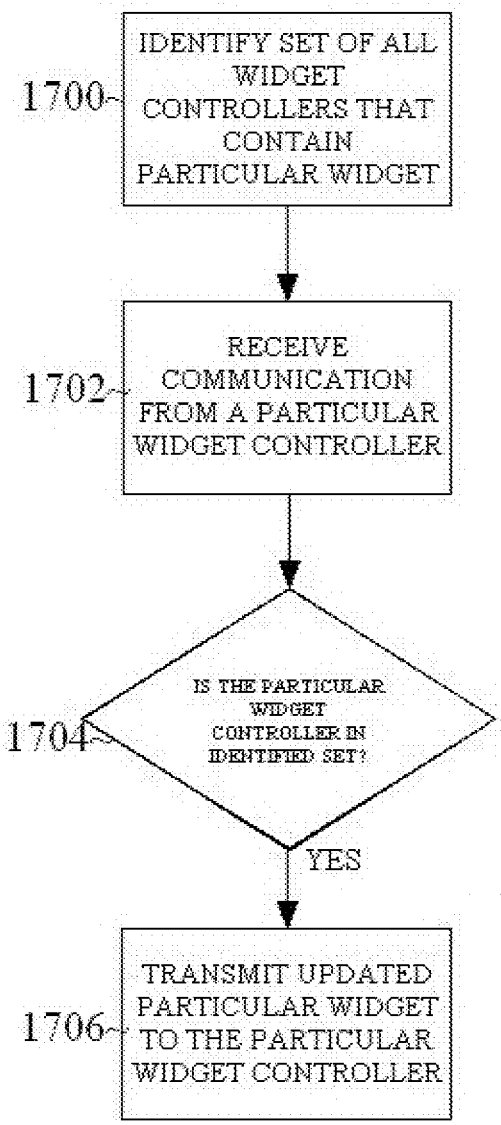
FIG. 17 is a flowchart illustrating an exemplary method of passively updating widgets, according to an embodiment.

FIG. 17 is a flowchart illustrating an exemplary method of automatically updating widgets, according to an embodiment.

The method can begin with operation 1700, which identifies the set of all widget controllers that contain a particular widget. The particular widget is a widget version that the widget developer wishes to update/upgrade. The widget administrator maintains a database of all widgets (that it knows about) and identities of all widget controllers (and their host web pages) that have the particular widget in their respective widget set. The set of all widget controllers that contain the particular widget thus can be ascertained by a simple database query.

From operation 1700, the method can proceed to operation 1702, which receives a communication from a particular widget controller. Typically, the communication would be received when the particular widget controller is activated (opened on a visited web page by a visitor to the web page). The widget controller will communicate with the widget administrator in order to determine the widget controller's respective widget set.

From operation 1702, the method can proceed to operation 1704, which determines whether the particular widget controller is in the identified set (thus meaning that the particular widget will be included in the particular widget controller displayed on the visited web page). If so, then the particular widget should be downloaded from the widget administrator so that the visitor's computer gets the latest version of the widget).

Alternatively, the current stored version number of the particular widget can be compared against a latest version number in order to determine if the visitor has the latest version (this would not require operation 1700). If not, then the visitor should download the latest version of the widget from the widget administrator.

If the determination in operation 1704 determines that the visitor needs the latest version of the widget, then the method can proceed to operation 1706, which transmits (downloads) the updated particular widget to the particular widget controller (actually the visitor's storage device, wherein the particular widget controller will access the widget on the storage device). Thus, the particular widget controller now has the latest version of the widget.

Figure 18:
FIG. 18 is a drawing illustrating an embodiment of a widget controller embedded into a portable device, according to an embodiment.

FIG. 18 is a drawing illustrating an embodiment of a widget controller embedded into a portable device, according to an embodiment.

All embodiments described herein can be used with a portable computing device, such as a personal digital assistant (PDA), cellular phone, smart phone, notebook computer, etc. These devices commonly have Internet connectivity and thus all methods herein can be applied to such devices as well. In addition, if these devices do not have internet connectivity directly, they may be coupled to a device that enables them to enjoy content from the internet via some connection, such as a USB cord, firewire, infrared, Bluetooth, etc.

A cellular phone output display 1800 is shown with a widget controller 1802 overlayed therein. A fixed area of such a display 1800 can be apportioned for the widget controller 1802. The owner/operator of the portable device can also move the fixed area displaying the widget controller 1802 to different areas of the output display 1800, as to the operator's preferences.

Since output display area is typically limited on such a portable device, using the widget controller 1802 serves to help conserve display space on such devices and easily move between widgets.

Many embodiments described herein relate to embedding a widget controller onto a web page.

Figure 19:
FIG. 19 is a screen shot illustrating an embodiment of a widget controller embedded into a web page, according to an embodiment.

FIG. 19 is a screen shot illustrating an embodiment of a widget controller embedded into a web page, according to an embodiment.

A web page 1900 is a "MySpace web," although of course any kind of web page can be used. The web page can be a social or business networking page, a personally designed page of an owner located on any server, a blog page, or in theory any web page at all.

A widget controller 1902 is embedded into the web page 1900. Thus, instead of the web page 1900 having to display multiple widgets, the single widget controller 1902 can take on the functionality of multiple widgets by allowing the visitor to this web page to scroll through the widget controller's 1902 set of widget until the visitor selects a widget the visitor wishes to use (or have run in the background). The "owner" of this MySpace page, Robert, had administrative capabilities over the widget controller and he (by using his username/password) can alter the widget set on the widget controller 1902.

The widget administrator (see FIG. 6, item 616) would typically be in communication with the visitor's web browser so that the web browser can display the widget controller's current set of widgets. Any widgets that the visitor does not have locally on the visitor's computer can be automatically downloaded to the widget controller displayed on the visitor's computer (either all at once, or on an as needed basis).

Various embodiments of systems, methods, and computer programs for implementing a widget controller are disclosed. The widget controller comprises an integrated user interface mechanism that enables selective presentation of a plurality of widgets. The widget controller may be implemented in various environments or platforms, may be configured with various widget management functions, and may support various forms of targeted advertisements, such as those described herein.

Figure 20:
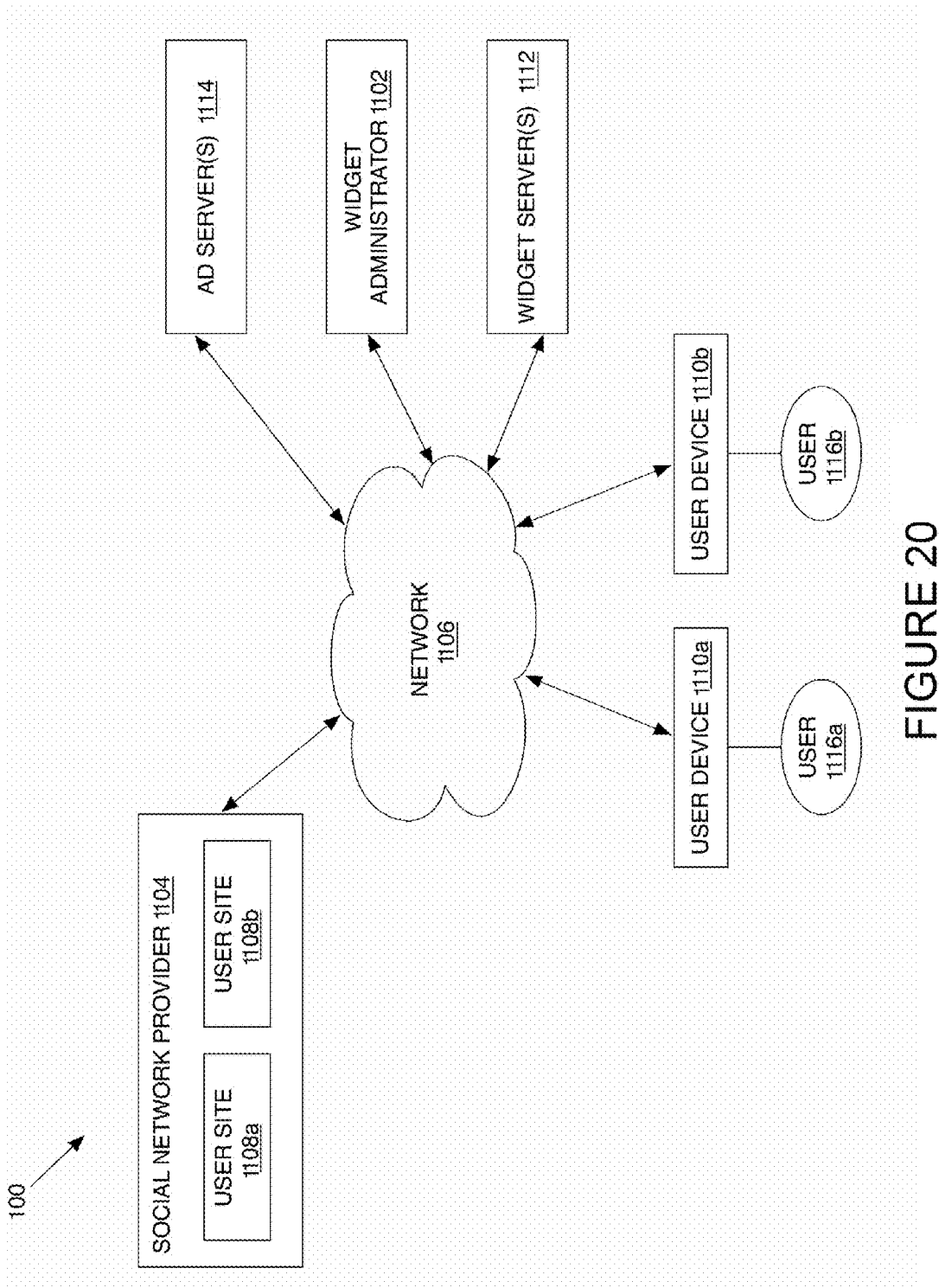
FIG. 20 illustrates an embodiment of a widget management system for implementing a widget controller on a social networking application provided by a social network provider.
Figure 21:
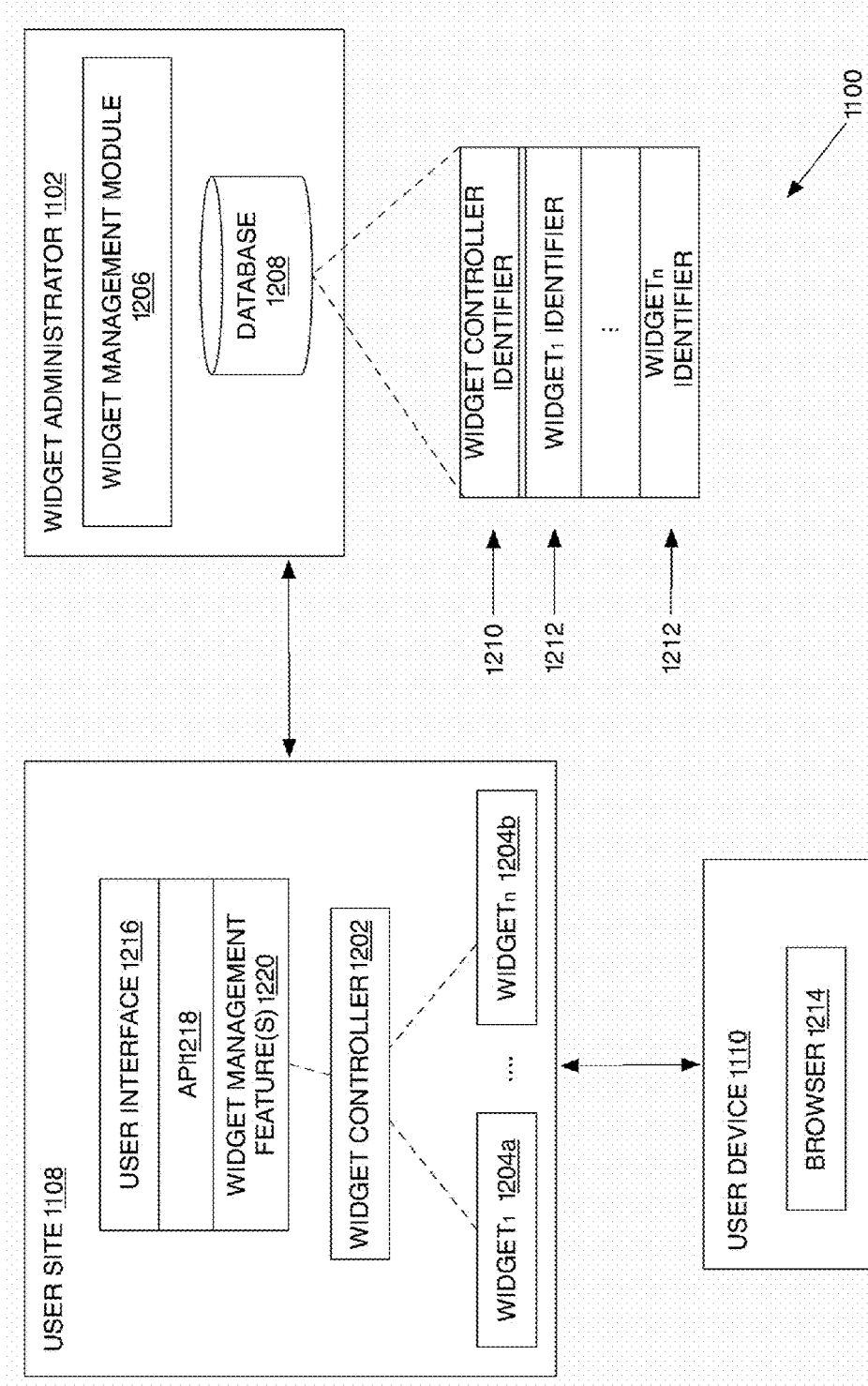
FIG. 21 further illustrates a widget management system for implementing a widget controller on a social networking application provided by a social network provider.

FIGS. 20 & 21 illustrate an embodiment of a widget management system 1100 for implementing a widget controller on a social networking application provided by a social network provider 1104. The social networking application provides any suitable social networking service. For example, the social network provider may host a website that allows one or more users of the user devices 1110 to communicate with one another via the website. On the website, each user may maintain a user site 1108. In the exemplary embodiment of FIG. 20, a user 1116a may create and manage a user site 1108a on the social networking application (via one or more user device(s) 1110a), and a user 1116b may create and manage a user site 1108b (via one or more user devices 110b). It should be appreciated that the user devices 1110 may comprise any computing device, portable or otherwise, that may communicate with the social networking application via the network 1106.

As illustrated in FIG. 20, the widget management system 1100 comprises the social network provider 1104, a widget administrator 1102, widget server(s) 1112, ad server(s) 1114, and user device(s) 1110 interconnected via a network 1106. The widget controller 1202 (which may itself be a widget) may be placed on a social networking application. The social networking provider 1104, ad server(s) 1114, widget administrator 1102, and widget server(s) 1112 are illustrated as separate entities in FIG. 20, although any two or more components may be combined into a single component or affiliated components. Each of these system components may be configured as described herein.

The social networking application may configure various details for widget controller 1202. The widget controller 1202 may communicate with the social networking application via any suitable communication protocol or application programming interface (API). The widget management system 1100 may track solid metrics on both the use of the widget controller 1202 and the configurations in the social networking application, and provide administrators ways to build views and reports based on that data on-the-fly.

The widget controller 1202 may be placed on the user site 1108a on the social networking application. As illustrated in FIG. 21, in an embodiment, the widget controller 1202 may be configured to control one or more associated widgets 1204. The widget controller 1202 may control any number of widgets 1204 (e.g., unlimited, limited by number or category, etc.) and enable a user 1116 to select, from a single or integrated user interface mechanism, any of the widgets 204 associated with the widget controller 1202 for current display. In an embodiment, the widget controller 1202 comprises a user interface component 1216, an application program interface (API) 1218, and various features or functionality for configuring and managing the widget controller 1202 (widget management features 1220). The widget controller 1202 may be configured to retrieve settings for the widgets 1204 (e.g., via widget server(s) 1112 or from a local or remote memory). The widget controller 1202 may also be configured to initialize each widget 1204, for example, upon user request. In an embodiment, the widget controller 1202 may be configured to retrieve any of the following, or other, types of information: number of widgets 1204 in the widget set; each widget's name and metadata (e.g., category, ranking, etc.); widget location.

With these types or other types of data, in an embodiment, the widget controller 1202 displays one widget 1204 at a time from the associated set of widgets 1204. The widget controller 1202 may also principally display one widget 1204, with smaller or thumbnail views displayed on some or all of the other widgets 204 associated with the widget controller 1202. The widget controller 1202 may display the current widget 1204 in a widget display portion. In an embodiment, the user interface 1216 is configured to suppress the presentation of some or all of the widget management feature(s) 1220 until it is invoked by the user 1116. For example, the user interface 1216 may comprise a widget display portion functioning as a foreground interface for displaying the current displayed widget 1204 and a background interface for presenting the widget management features 1220. The background interface may be engaged and, thereby, presented in response to any suitable input. In an embodiment, a management icon may be displayed in the foreground interface with the current widget 1204. In response to a user input (e.g., selecting the icon, mouse-over, etc.), the background interface containing the widget management feature(s) 1220 may be presented. It should be appreciated that various user interface mechanisms may be implemented. The widget management functionality maintains the list of widgets 1204 and enables the convenient selection of the widgets 1204 via the widget controller 1202. When a user selects a particular widget 1204, the widget controller 1202 may make a request to the widget administrator 1102 or a widget server 1112 (FIG. 21) to obtain and display the widget 1204 in, for example, an asynchronous fashion.

Figure 22:
FIG. 22 illustrates a widget management toolbar that may be displayed in association with the current widget being displayed.
Figure 24:
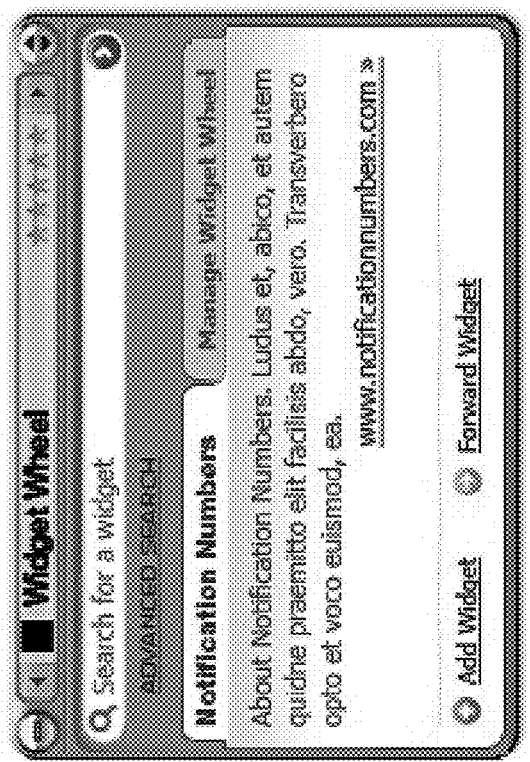
FIG. 24 illustrates an additional tab menu that may be engaged and/or disengaged for display in the widget management toolbar.
Figure 23:
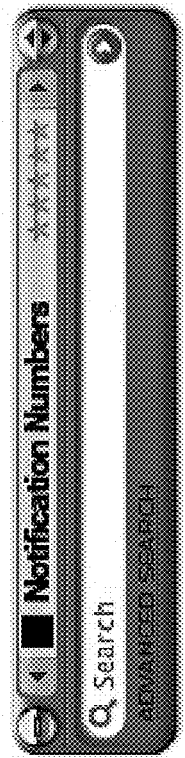
FIG. 23 illustrates a widget management toolbar with a drop-down button for engaging a widget search functionality.
Figure 26:
FIG. 26 illustrates a widget identification display portion that includes left and right arrows (or alternative navigation buttons) for cycling or otherwise navigating or selecting the associated widgets.
Figure 25:
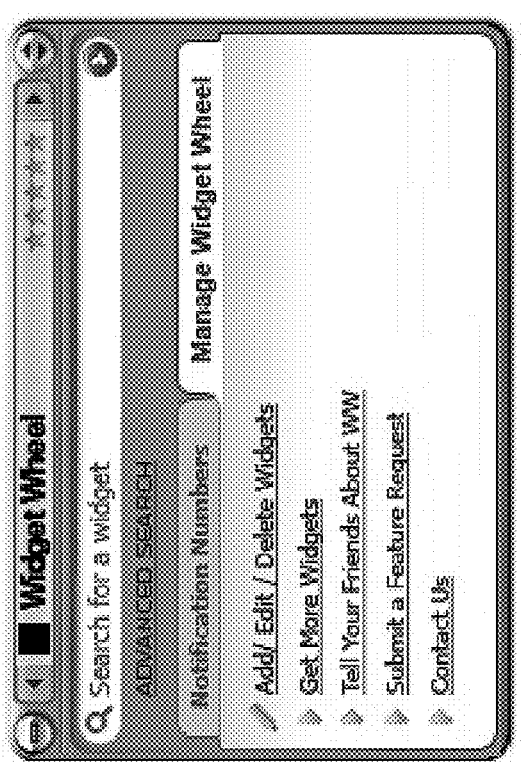
FIG. 25 illustrates another additional tab menu that may be engaged and/or disengaged for display in the widget management toolbar.

FIGS. 22-26 illustrate additional embodiments of user interface mechanisms for implementing one or more aspects of a widget controller 1202. FIG. 22 illustrates a widget management toolbar that may be displayed in association with the current widget being displayed. The widget management toolbar may provide various user input mechanisms for selecting or otherwise engaging the widget management features 1220. For example, the widget management toolbar may include a drop-down button for engaging a widget search functionality (FIG. 23), which enables the user to enter search terms in a text box or further search based on advanced search features. The widget management toolbar may include a widget identification display portion that identifies the name of the widget currently being display. In the examples of FIG. 23, the widget being displayed is entitled "Notification Numbers." The widget management toolbar may also include various navigation features for enabling the user to select which widget 1204 to display in the widget display portion. As best illustrated in FIG. 26, in an embodiment, the widget identification display portion may include left and right arrows (or alternative navigation buttons) for cycling or otherwise navigating or selecting the associated widgets 1204. In another embodiment, a drop-down menu may be used to display the associated widgets 1204 in a scrollable list from which a new widget 204 may be selected for display. FIGS. 24 & 25 illustrate additional tab menus that may be engaged and/or disengaged for display in the widget management toolbar. One tab may display additional information about the current widget 1204 (in this case, a widget entitled "Notification Numbers"). This tab may also be used for displaying search results, in which case an "add widget" or "forward widget" functionality may be included for adding the particular widget 1204 or forwarding the widget 1204 to another user via email, the social networking application, or other communication means. As further illustrated in FIG. 24, a Manage Widget Wheel tab may provide a convenient menu for accessing the widget management features 1220.

Referring again to FIG. 21, the widget administrator 1102 administers the widget controllers 1202 across the user sites 1108 hosted by the social network provider 1104 (or other web sites, desktops, etc.). The widget management module 1206 controls the general operation of the widget administrator 1102 and the functional interfacing with the widget controllers 1202 and the ad server(s) 1114 and the widget server(s) 1112, where applicable. The widget management module 1206 also interfaces with the database 1208, which maintains a logical mapping between the widget controllers 1202 and their respective widget sets. As illustrated in FIG. 21, in an embodiment, each widget controller 1202 and widget 1204 may be referenced with a unique identifier (widget controller identifier 1210 and widget identifier 1212), and the database 1208 may maintain a list of widget identifiers 1212 for each widget controller identifier 1210.

The widget controller 1202 and/or the widget administrator 1102 may provide several functions that support a user being redirected to the user site 1108. For instance, as mentioned above in connection with the embodiment of FIG. 24, the widget controller 1202 may support a "forward this widget", "add this widget", or "configure this widget". It should be appreciated that these or other features may be implemented in various ways. Under any circumstances, a particular functionality may be able to be accomplished from the widget controller 1202. If not from the widget controller 1202, if the widget controller 1202 is provided by the social network provider 1104, for example, then the user 1116 may be able to do this functionality from the social networking site or a site provided by the widget administrator 1102 or a third party. Upon clicking any of these buttons, the user will be redirected to the website where they may need to login. If they are not already logged in (cookies may be used to persist logins across browser sessions), they may login and then be directed to the page they initially requested. It should be appreciated that other or alternative functionality may be included, such as, for example, lineup changes, widget searches, etc.

The web application (or the widget controller 1202) may be configured to enable the user 1116 to configure the widget controller 1202 and/or the associated widgets 1204, including the order in which they are displayed and settings about how they are displayed such as categories.

In an embodiment, the web application may work within the context of a user. Other than the initial informative pages, the web application may require user context. If a user requests pages and they are not logged in, they may be redirected to a login page. To accommodate requests initiated from a widget controller 1202, the application may support redirects after both login and initial registration. Registration may work in the typical web fashion with the user entering an email address and password and receive a confirmation email that may be followed within a predetermined period of time (with expiring registration key) to properly activate the account. Once the user is registered, they may be prompted to configure their account information. The application may use the API 1218 to verify login and display the user's settings in a profile page. The application may parse the widgets 1204 in pre-determined formats that it knows can be hosted. To accomplish this, the system may understand the widget format of known platforms and parse the HTML of the social networking site 1108 looking for such widgets. The widget management system 1100 may be architected so it is possible to know when two widget controllers 1202 include the exact same widget 1204.

Once the application has parsed and displayed the widgets 1204, the user 1116 may add them to the widget controller 1202 and organize the order in which they appear. This may happen via, for example, dynamic HTML, AJAX, etc. so that changes are saved on the server and the user does not have to specifically save the configuration. The user 1116 may also add widgets 1204 by searching the database 1208. At any point in the process, the user 1116 may be able to publish the widget controller 1202 to user site 1108 or other web site or desktop.

It should be appreciated that various aspects of the widget controller 1202 described above may be implemented via the browser 1214, a browser plug-in or extension, or other functionality located on user device(s) 1110, or any combination thereof. The user device 1110 may include special-purpose browser functionality configured to manipulate the presentation code associated with the user sites 1108 or other web pages. In an embodiment, the browser functionality may "hijack" the HTML that is on the page when a user 1108 visits a social networking page. The browser functionality may be configured to manipulate the HTML and provide various additional features associated with the control of widgets.

In an embodiment, the special-purpose browser functionality may be configured to manipulate the HTML code and automatically identify embedded widgets that are not associated with the widget controller 1202. The identified widgets may then be automatically added to a new or preexisting widget controller 1202. Similar or alternative browser or other functionality may enable a user to control how visitors interact with the widgets 1204 on their site. For example, the user may specify which widgets 1204 are viewable on, for example, a user-by-user basis or otherwise. The user running the browser functionality may also specify the kinds of widgets 1204 they want to view. When the HTML code is read by the special-purpose browser functionality, only specified widgets or types of widgets will be added to the widget controller 1202.

In another embodiment, the special-purpose browser functionality may enable a visitor to a user site 1108 to modify the widget controller 1202 associated with the user site 1108 by adding or deleting certain widgets 1204. For instance, a user site 1108 may include a widget controller 1202 having twenty associated widgets 1204. A visitor to the user site 1108 may also have a widget controller 1202 having fifteen associated widgets 1204. Using the special-purpose browser functionality, when the visitor visits the user site 1108, the widget controller 1202 may be augmented with one or more of the visitor's fifteen widgets 1204

It should be appreciated that the widget management system 1100 may enable various additional features, services, etc. for enabling users to manage widgets across multiple platforms (e.g., web widgets, desktop widgets, mobile widgets). For example, in an embodiment, the widget management system 1100 may be configured to synchronize a widget controller 1202 across multiple social networking sites. A user 1116 may employ a widget controller 1202 on more than one site 1108 or across different social networking or other platforms. The user 1116 may configure an account to synchronize one widget controller 1202 with one or more other widget controllers 1202 so that the same content (or similar or selected content) is on both. The synchronization feature may allow selection of which widgets 1204 are to be synchronized. In other embodiments, the widget administrator 1102 may also enable the user 1116 to automatically add a widget controller 1202 from one profile to another.

The widget management system 1100 may also enable users 1116 to control access rights to particular widgets 1204 in the widget controller 1202. In an embodiment, the user 1116 may limit or select which visitors to the user site 1108 may be able to see and/or interact with all or certain of the widgets 1204. To support this feature, the widget management system 1100 may categorize widgets 1204 into one of the following categories: public; private; or semi-private. The public category enables anyone who has access to a profile owner's profile to view or consume the widget. The private category enables only the profile owner to access to widget. The semi-private category enables a selected group of visitors to access the widget.

Widget publishers or distributors may use the widget management system 1100 to create and distribute packages or groups of widgets 1204 for users 1116 based on various categories of interests. For instance, a widget publisher may create a grouping of widgets 1204 for a baseball enthusiast (i.e., a group of widgets related to baseball). The users 1116 may subscribe to the group or "playlist". The widget publisher or distributor may remove and/or add widgets to the playlist, and the widget management system 1100 may automatically add or remove the widgets 1204 from the corresponding widget controllers 1202.

The widget management system 1100 may also enable a user 1116 to copy widgets 1204 from another user's widget controller 1204 to their own. For example, a visitor to a user site 1108 may want to duplicate some or all of the content on that user's widget controller 1204. The widget administrator 1102 and the widget controller 1202 may be configured to support this additional level of widget portability. This portability may be integrated with the access rights described above to further control which users are able to copy widgets from the widget controller 1202. A user 1116 may also add widgets 1204 from their widget controller 1202 to another user's widget controller 1202. This can happen in a variety of ways including through automatic actions taken by the visitor to the profile owner's page or via sending a request to the profile owner to authorize the addition (the request may be automatically sent by the system). Further, in a related embodiment, the visitor making the request may be required to be a "friend" of the profile owner (i.e., someone who has received authorization to make such a request). The profile owner may also specify which users are able to add widgets 1204 to their widget controller 1202.

The widget management system 1100 may support community groups of widgets. A user 1116 or a widget publisher may define a group of widgets 1204. Users 1116 may join or otherwise subscribe to the group. Each member of the community (or other selected individuals) may add and/or delete widgets 1204 and such actions are automatically updated for each of the corresponding widget controllers 1202.

The widget management system 1100 may also enable a user 1116 to incorporate contact information from a local or remote list of contacts and then search whether the imported contacts have a widget controller 1202. The contact list may be uploaded from, for example, a web-based mail or contact system. The user 1116 may search on the list(s) to determine which contacts have a widget controller 1202 with the widget administrator 1102. The user 1116 may also copy widgets to their own widget controller 1202. The system may also enable users 1116 to automatically receive alerts when their "friends" add, delete, or otherwise alter the contents of their widget controller.

The widget administrator 1102 may support various methods for distributing widgets 1204 to users 1116. In an embodiment, a widget publisher or distributor may use the widget administrator to periodically send widgets 1204 to users 1116. The system may send an email highlighting new widgets that now conform to the platform. This could be a generalized email or could contain some customization based on the social network. For example, the system may send network updates, such as who in a user's network downloaded a widget controller 1202, added widgets 1204, etc. These and other distribution mechanisms may be developed to encourage content adoption, feature usage, and connections with other users 1116.

As mentioned above, the widget controller 1202 comprises a user interface 1216 and may support various widget management feature(s) 1220. In one embodiment, the widget controller 1202 maintains usage data for the widgets 1204 indicating which widgets have been used or unused and how often. The user interface 1216 may include a mechanism for enabling users 1116 to easily delete widgets 1204 in their widget controller. In an embodiment, upon an attempt to delete a widget 1204, the user 1116 may be prompted with user statistics related to that widget 1204.

The widget administrator 1102 may also support alerts related to widgets 1204 to blogs or walls on the social networking site.

It should be appreciated that the architecture of the widget management system 1100 supports various novel approaches for deriving revenues from the distribution of widgets 1204. In an embodiment, the widget management system 1100 may enable widget publishers to monetize their content by affiliating with the widget administrator 1102. Affiliated widget publishers may be promoted on the widget controllers 1202. The widget administrator may also sell advertising and provide revenue back to widget publishers.

As mentioned above, the user interface 1216 (FIG. 21) may support any desirable presentation mechanisms. In one embodiment, the widget controller 1202 may automatically rotate through the set of widgets 1204 without any user interaction. In another embodiment, to improve advertising opportunities, the widget controller 1202 may change the current widget 1204 based on the user interactions with the user site 1104. The size of the widget controller 1202 and the display characteristics of the widgets 1204 may be customized by users 1116, the widget administrator, or the widget publishers.

It should be appreciated that various desirable widget management features 1220 may be integrated with the widget controller 1202. For example, the widget controller 1202 may support a "favorites list" by which a user 1116 may set up their favorite widgets for quick access via, for example, a drag down menu.

In an embodiment, the widget controller 1202 may be integrated with the particular user interface design/constraints of the social network provider 1104. For example, the social network provider 1104 may control the particular location within the user sites 1108 where widgets are allowed to be displayed. For example, the user sites 1108 may implement a tabbed interface in which the widgets 1204 are relegated to a back tab rather than being displayed on a front page or front tab. In this constrained environment, the widget controller 1202 may be displayed on the front page, front tab, or otherwise, and the widget controller 1202 may be configured to interface with the widgets tab (e.g., via API 1218). The user 1116 may associate widgets 1204 with the widget controller 1202 and have them resonant on the widgets tab. The user site 1108 (or the widget controller 1202) may also be configured with a "checkbox" or similar user input mechanism for selecting which widgets 1204 listed on the widgets tab are to be associated with the widget controller 1202. If the user 1116 selects a set of widgets 1204, these widgets are automatically associated with the widget controller 1202. In an embodiment, the widget controller 1202 may be located on a user's front page of their profile so that the applications do not take up too much space on the front page. In addition, outside widgets not appearing on the back tabbed page may also be able to be associated with this particular instance of the widget controller 1202.

It should also be noted that certain sites may not allow the widget controller to be displayed directly on the profile page, but may designate an area or "canvas" on which such application interfaces may be displayed. In this situation, the widget controller would be placed on this type of area of the social networking (or other internet site) location. In addition, the social networking sites (in such event) may allow a link from the home page to the canvas or other area from which someone visiting the profile may access the widget controller. In all instances in this patent application where reference is made to the "profile" page, please note that this may also be construed to include, without limitation, situations where an application canvas page is used (with or without a link from the main profile page).

The widget controller 1202 and/or the widget administrator 1102 may include functionality for "fingerprinting" or identifying existing widgets 1204 (e.g., based on characteristics of the widget code, etc.) on user site 1108 or other web pages. The fingerprinting functionality may easily and automatically recognize particular widgets 1204 and then associate them with the widget controller 1202 and store appropriate identification information in the database 1208. For example, it may be difficult to identify a widget 1204 by automatically looking at it or by accessing the code. To facilitate the management of database 1208 and the widget controllers 1202, the widget administrator 1102 may identify a particular widget based on, for example, its unique characteristics such as the images, the colors, text, size, shape, audio and other factors that make the widget unique.

It should be appreciated that the widget controller 1202 may advantageously be integrated with other web technologies, platforms, etc., such as, for example, blogging or micro-blogging platforms, or other online communication, sharing or other types of platforms. The platforms may integrate with the widget controller 1202 to provide another level of benefit and integration to users. Integration with a photo-sharing platform may, for instance, include functionality for automatically associating pictures associated with a profile owner onto that profile owner's widget controller 1202.

The widget controller 1202 may also be configured to enable photos, audio, videos, blogs, mini blog fees, or other types of data or media to be displayed or "consumed" within the widget controller 1202. For example, users 1116 may be able to insert, within their list of associated widgets 1204, content that they want to include (e.g., one channel is a widget, the next is a photo, etc.). This type of integration may encourage visitors to flip through widgets they wouldn't otherwise decide to access.

It should be appreciated that the widget controller 1202 may store any desirable data or information to provide a convenient mechanism for providing data portability across platforms, sites, etc. The data or information need not be displayed within the widget controller 1202, although it may be stored in the database 1208 (or locally). In this manner, when the widget controller 1202 transfers information about widgets 1204 across multiple platforms, sites, etc., the other data may also be transferred or synchronized. In an embodiment, a user 1116 may choose to include non-widget information/content packaged within their widget controller 1202 and export it to another site (e.g., another social network provider or other third party site) or otherwise essentially "briefcase" the data.

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

Any component, server, database, computer, etc., described herein can also be split up to comprise multiple components in a same or different locations (connected by a communications network). Thus, for example, while the widget administrator is referred to herein as one unit, it can actually exist over different databases, servers, processors, storage devices, entities, etc. Any connection described herein can either be a direct connection or indirection connection through other nodes or components (either described herein or not). Further, any component or unit described herein can communicate with any other component or unit described herein, whether such communication is explicitly described herein or not.

It is noted that the order of any of the operations described herein can be performed in any order. Any operation described herein can also be optional. Any embodiments herein can also be stored in electronic form and programs and/or data for such can be stored on any type of computer readable storage medium (e.g. CD-ROM, DVD, disk, etc.).

The descriptions provided herein also include any hardware and/or software known in the art and needed to implement the operations described herein. All components illustrated herein may also optionally communicate with any other component (either illustrated/described herein or not described but known in the art).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, performed by a system comprising a server configured by stored computer code, the method, comprising:
   creating and storing, by the server, respective definitions of a first widget controller and a second widget controller, both the first and second widget controller comprising: logic configured to display an associated set of embedded widgets, a scroll-backward button, a scroll-forward button, an add button, and logic configured to cycle a displayed embedded widget upon receiving a click of either the scroll-forward button or the scroll-backward button when the widget controller is displayed, each of the first and second widget controllers configured to display only one embedded widget of the associated set of embedded widgets inside the respective widget controller;
   causing, by the server, the first widget controller to be displayed on a first output device displaying a first web page, the first widget controller embedded on the first web page;
   causing, by the server, the second widget controller to be displayed on the second output device displaying a second web page, the second widget controller embedded on the second web page;
   causing, by the server, in response to an activation of the add button on the second widget controller displayed on the second web page when a particular widget is being displayed inside the second widget controller, the particular widget to add to the first widget controller;
   updating, by the server, the respective definition of the first widget controller to reflect the add of the particular widget to the first widget controller, and updating the first widget controller displayed on the first web page.

2. The method as recited in claim 1, wherein the HTML code defining the first web page is automatically manipulated to provide additional features associated with control of widgets.

3. The method as recited in claim 1, wherein the second widget controller is configured to set access rights to widgets associated with the second widget controller.

4. The method as recited in claim 1, wherein the second widget controller has a unique identifier.

5. An apparatus, comprising:
   an internet connection;
   a server connected to the internet connection, the server connected to a non-transitory computer readable storage medium storing computer readable instructions, the server configured to read and execute the computer readable instructions, the computer readable instructions programmed to cause the server to:
   create and store respective definitions of a first widget controller and a second widget controller, both the first and second widget controller comprising: logic configured to display an associated set of embedded widgets, a scroll-backward button, a scroll-forward button, an add button, and logic configured to cycle a displayed embedded widget upon receiving a click of either the scroll-forward button or the scroll-backward button when the widget controller is displayed, each of the first and second widget controllers configured to display only one embedded widget of the associated set of embedded widgets inside the respective widget controller;
   cause the first widget controller to be displayed on a fi-r output device displaying a first web page, the first widget controller being embedded on the first web page;
   cause the second widget controller to be displayed on a second output device displaying a second web page, the second widget controller being embedded on the second web page;
   upon receipt of an activation of the add button on the second widget controller displayed on the second web page when a particular widget is being displayed inside the second widget controller, cause the particular widget to add to the first widget controller; and
   update the respective definition of the first widget controller to reflect the add of the particular widget to the first widget controller, and update the first widget controller being displayed on the first web page.

6. The apparatus as recited in claim 5, wherein the server is further configured such that the HTML code defining the first web page is automatically manipulated to provide additional features associated with control of widgets.

7. The apparatus as recited in claim 5, wherein the second widget controller is configured to set access rights to widgets associated with the second widget controller.

8. The apparatus as recited in claim 5, wherein the second widget controller has a unique identifier.

* * * * *